(12) United States Patent
Kim

(10) Patent No.: US 9,921,648 B2
(45) Date of Patent: Mar. 20, 2018

(54) APPARATUSES, METHODS AND RECORDING MEDIUM FOR CONTROL PORTABLE COMMUNICATION TERMINAL AND ITS SMART WATCH

(71) Applicant: University of Seoul Industry Cooperation Foundation, Seoul (KR)

(72) Inventor: Jin Suk Kim, Seoul (KR)

(73) Assignee: University of Seoul Industry Cooperation Foundation (KR)

( * ) Notice: Subject to any disclaimer, the term of this patent is extended or adjusted under 35 U.S.C. 154(b) by 0 days.

(21) Appl. No.: 14/184,995

(22) Filed: Feb. 20, 2014

(65) Prior Publication Data

US 2014/0244505 A1 Aug. 28, 2014

(30) Foreign Application Priority Data

| Feb. 22, 2013 | (KR) | ......................... 10-2013-0019414 |
| Jun. 25, 2013 | (KR) | ......................... 10-2013-0073169 |
| Nov. 6, 2013 | (KR) | ......................... 10-2013-0134022 |

(51) Int. Cl.

| G06F 3/01 | (2006.01) |
| G06Q 20/30 | (2012.01) |
| G06Q 20/32 | (2012.01) |
| G06Q 20/38 | (2012.01) |
| G06Q 20/40 | (2012.01) |
| G04G 21/00 | (2010.01) |
| G06F 1/16 | (2006.01) |

(52) U.S. Cl.
CPC ............ *G06F 3/014* (2013.01); *G04G 21/00* (2013.01); *G06F 1/163* (2013.01); *G06F 1/1694* (2013.01); *G06F 3/017* (2013.01); *G06Q 20/30* (2013.01); *G06Q 20/322* (2013.01); *G06Q 20/382* (2013.01); *G06Q 20/40* (2013.01); *G06F 2200/1637* (2013.01)

(58) Field of Classification Search
CPC ....................................................... G06F 3/014
USPC ............................................................. 705/44
See application file for complete search history.

(56) References Cited

U.S. PATENT DOCUMENTS

| 6,111,580 | A  | * | 8/2000 | Kazama | ................. G06F 3/017 340/575 |
| 7,572,008 | B2 | * | 8/2009 | Elvesjo | ................. A61B 3/113 351/206 |
| 7,747,068 | B1 | * | 6/2010 | Smyth | ................. G03B 17/00 382/154 |
| 8,954,895 | B1 | * | 2/2015 | Yaksick | ................. G06F 3/04817 715/863 |
| 9,098,069 | B2 | * | 8/2015 | Dickinson | ................. G06F 1/163 |
| 9,372,872 | B2 | * | 6/2016 | Murata | ................. G06F 17/30274 |
| 2003/0085870 | A1 | * | 5/2003 | Hinckley | ................. G06F 1/1626 345/156 |
| 2006/0028429 | A1 | * | 2/2006 | Kanevsky | ................. G06F 3/011 345/156 |

(Continued)

FOREIGN PATENT DOCUMENTS

WO WO 2007085682 A1 * 8/2007 ............. G06F 31/00

*Primary Examiner* — Alexander G Kalinowski
*Assistant Examiner* — Paul R Kloberg
(74) *Attorney, Agent, or Firm* — Harness, Dickey & Pierce, PLC

(57) ABSTRACT

Disclosed are an apparatus, a method, and a recording medium for controlling a portable communication terminal and a smart watch of the portable communication terminal, which control an operation of a display unit only when a user obtains information on a movement of the smart watch from a sensor installed in the smart watch and view the smart watch.

4 Claims, 28 Drawing Sheets

(56) References Cited

U.S. PATENT DOCUMENTS

| | | | |
|---|---|---|---|
| 2007/0064091 A1* | 3/2007 | Park | G06F 3/017 348/14.01 |
| 2007/0171190 A1* | 7/2007 | Wang | G06F 3/0346 345/156 |
| 2008/0192990 A1* | 8/2008 | Kozakaya | G06K 9/00221 382/117 |
| 2009/0316532 A1* | 12/2009 | Hasegawa | G04C 3/002 368/1 |
| 2010/0161434 A1* | 6/2010 | Herwig | G06Q 20/201 705/20 |
| 2011/0004439 A1* | 1/2011 | Tanabe | G01C 9/06 702/154 |
| 2011/0205851 A1* | 8/2011 | Harris | G04G 9/0064 368/14 |
| 2011/0237275 A1* | 9/2011 | Hanada | G01S 19/34 455/456.1 |
| 2011/0316888 A1* | 12/2011 | Sachs | G06F 1/1626 345/667 |
| 2012/0064951 A1* | 3/2012 | Agevik | G06F 3/0346 455/569.1 |
| 2012/0194976 A1* | 8/2012 | Golko | G06F 1/163 361/679.01 |
| 2013/0034265 A1* | 2/2013 | Nakasu | G06K 9/00208 382/103 |
| 2013/0038490 A1* | 2/2013 | Garcia | G01S 1/68 342/451 |
| 2013/0090881 A1* | 4/2013 | Janardhanan | G01C 22/006 702/104 |
| 2013/0120459 A1* | 5/2013 | Dickinson | G06F 1/163 345/650 |

* cited by examiner

APPARATUSES, METHODS AND RECORDING MEDIUM FOR CONTROL PORTABLE COMMUNICATION TERMINAL AND ITS SMART WATCH

BACKGROUND OF THE INVENTION

1. Field of the Invention

The present invention relates to an apparatus, a method, and a recording medium for controlling a portable communication terminal by using an accessory such as a smart watch.

2. Description of the Prior Art

As the development of technology has been interlinked with an increase in user's demands since the early 2000s, mobility of a device such as a smart phone has been emphasized and a market for a portable communication terminal which can access the Internet has been significantly grown.

On the strength of marketability, the supply of smart phones has been expanded. As a size of the smart phone become larger, a demand for another terminal which can identify a content of the smart phone without having to pull the smart phone out of a pocket or a bag has increased.

The smart watch is being actively researched and developed as a wearable terminal which can meet the demands of such a market.

Further, a portable terminal having a Near Field Communication (NFC) communication technique may make payment in non-contact type within a short range (about 10 cm) from a payment device. At this time, the portable terminal may operate as an RF tag (that is, tag mode), or operate in a card emulation mode when a card payment is performed.

In any case, an action which brings the portable terminal close to the payment device within a predetermined distance (for example, 10 cm) may be considered as an action indicating a user's payment intention. Accordingly, there is an advantage in that an action of a user pulling cash or another payment means from out of a wallet or a bag or a conventional payment action which should be performed for the payment can be very simplified.

However, such an advantage may cause a risk that generates a payment which the user does not want. For example, the portable terminal may approach the payment device within a predetermined distance even though the user does not want it to. Particularly, since the portable terminal may be used as a payment device (for example, a payment reader) due to the nature of an NFC communication technique, although actual business transactions are not maliciously performed, an action that moves a payment device close to the portable terminal of the user within a predetermined distance may occur without the knowledge of the user.

Further, the smart watch performing wireless communication with a portable communication terminal such as a smart phone can be wearable on a wrist like a general watch and perform a function of interworking with a smart phone to display a content separately from the smart phone together with a function of displaying a time.

However, the convention smart watch has a small size due to the nature of a wearable terminal, and accordingly, has a significantly limited operation time. Therefore, it causes inconvenience to the user and such a problem is recognized as a very big error due to the nature of the terminal laying stress on mobility.

Further, the conventional smart watch has a small size due to the nature of a wearable terminal, and accordingly, has a significantly limited operation time, thereby increasing power consumption when a plurality of sensors are installed and operated.

Such a problem is recognized as a very big error due to the nature of the terminal laying stress on mobility.

Further, since a display of the smart watch is exposed to the outside, the user's privacy may be exposed when an arrival notification of a content including the user's personal information is generated or the content is displayed. Accordingly, a technology which can provide convenience of payment using the portable terminal and prevent a risk that a payment which the user does not want is generated is required.

SUMMARY OF THE INVENTION

In connection with the above described problem, the present invention has been made to solve the problem and an aspect of the present invention is to provide a secure payment system and method using a portable terminal and an accessory.

Specifically, an aspect of the present invention is to provide a system and a method for providing payment information of a portable terminal to an accessory and making payment via the accessory.

Another aspect of the present invention is to provide an apparatus, a method, and a recording medium for controlling a smart watch that control an operation of a display only when a user obtains information on a movement of the smart watch and views the smart watch.

Another aspect of the present invention is to provide an apparatus, a method and a recording medium for controlling a smart watch that control to change a displayed content according to a movement such as a rotation pattern of the smart watch.

Another aspect of the present invention is to provide an apparatus, a method, and a recording for controlling a smart watch that control an operation of a display only when a user obtains information on a slope of the smart watch from a sensor installed in the smart watch and views the smart watch.

Another aspect of the present invention is to provide an apparatus, a method, and a recording medium for controlling a smart watch that control to change a displayed content or a content display position based on display direction information and slope information of the smart watch.

Another aspect of the present invention is to provide an apparatus, a method, and a recording medium for controlling a smart watch that efficiently manage power by controlling the display of the smart watch through a simple sensor or signal processing by reducing a complex sensor or signal processing.

According to an embodiment of the present invention, an apparatus for controlling a smart watch is provided. The apparatus includes: an input unit for receiving position change information obtained from one or more of a speed change detecting sensor, an tilt sensor, and a gyroscope sensor; a reference direction configuration unit for calculating normal vector direction information of a display displaying a content based on the position change information and then configuring and storing the normal vector direction information as a reference direction value; a user direction configuration unit for calculating and configuring a forward direction value of a direction in which user's gaze direction based on the position change information; and a controller for controlling an operation of the smart watch based on the reference direction value and the forward direction value.

According to an embodiment of the present invention, a method of controlling a smart watch is provided. The method includes: receiving position change information obtained from one or more of a speed change detecting sensor, an tilt sensor, and a gyroscope sensor; calculating normal vector direction information of a display displaying a content based on the position change information and then configuring and storing the normal vector direction information as a reference direction value; calculating and configuring a forward direction value of a direction in which user's gaze direction based on the position change information; and controlling an operation of the smart watch based on the reference direction value and the forward direction value.

According to an embodiment of the present invention, a computer-readable recording medium recording a program for executing a method of controlling a smart watch is provided. The program implements a function of receiving position change information obtained from one or more of a speed change detecting sensor, an tilt sensor, and a gyroscope sensor; a function of calculating normal vector direction information of a display displaying a content based on the position change information and then configuring and storing the normal vector direction information as a reference direction value; a function of calculating and configuring a forward direction value of a direction in which user's gaze direction based on the position change information; and a function of controlling an operation of the smart watch based on the reference direction value and the forward direction value.

According to an embodiment of the present invention, an apparatus for controlling a smart watch is provided. The apparatus includes: at least one slope sensor unit for detecting a slope of the smart watch; an input unit for receiving information on a slope between the smart watch and a ground from the slope sensor unit; and a controller for controlling a display operation of the smart watch based on first slope information, second slope information, and a first reference value.

According to an embodiment of the present invention, a method of controlling a smart watch is provided. The method includes: detecting a slope of the smart watch by a slope sensor unit; receiving first slope information and second slope information from the slope sensor unit, and controlling a display operation of the smart watch based on the first slope information, the second slope information, and a first reference value.

According to an embodiment of the present invention, a method of controlling a smart watch is provided. The method includes: detecting a slope of the smart watch by a slope sensor unit, detecting a display direction of the smart watch by a direction detection sensor unit, receiving first slope information and second slope information from the slope sensor unit and receiving display direction information from the direction detection sensor unit, and controlling a display operation based on a result of a comparison between the first slope information or the second slope information and a first reference value and a result of a comparison between the display direction information and a second reference value.

According to an embodiment of the present invention, a computer-readable recording medium recording a program for executing a method of controlling a smart watch is provided. The program implements a function of detecting a slope of the smart watch, a function of receiving first slope information and second slope information, and a function of controlling a display operation of the smart watch based on the first slope information, the second slope information, and a first reference value.

According to an embodiment of the present invention, a computer-readable recording medium recording a program for executing a method of controlling a smart watch is provided. The program implements a function of detecting a slope of the smart watch, a function of receiving a display direction of the smart watch, a function of receiving first slope information, second slope information, and display direction information, and a function of controlling a display operation based on a result of a comparison between the first slope information or the second slope information and a first reference value and a result of a comparison between the display direction information and a second reference value.

According to the present invention, there is an effect of providing an apparatus, a method, and a recording medium for controlling a smart watch that control to reduce energy of the smart watch by controlling an operation of a display only when a user obtains information on a movement of the smart watch and views the smart watch.

Further, according to the present invention, there is an effect of providing an apparatus, a method and a recording medium for controlling a smart watch that prevent a content related to the user's privacy from being exposed to the outside by controlling to change a displayed content according to a movement such as a rotation pattern of the smart watch.

According to the present invention, there is an effect of providing an apparatus, a method, and a recording medium for controlling a smart watch that control an operation of a display only when a user obtains information on a slope of the smart watch from a sensor installed in the smart watch and views the smart watch.

Further, according to the present invention, there is an effect of providing an apparatus, a method, and a recording medium for controlling a smart watch that control to change a displayed content or a content display position based on display direction information and slope information of the smart watch.

In addition, according to the present invention, there is an effect of providing an apparatus, a method, and a recording medium for efficiently managing power by controlling a display of the smart watch through a simple sensor or signal processing by reducing a complex sensor or signal processing.

DETAILED DESCRIPTION OF THE PREFERRED EMBODIMENTS

Hereinafter, a few embodiments of the present invention will be described with reference to the accompanying drawings. In addition, terms, such as first, second, A, B, (a), (b) or the like may be used herein when describing components of the present invention. This term is merely used to distinguish one structural element from other structural elements, and a property, an order, a sequence and the like of a corresponding structural element are not limited by the term. It should be noted that if it is described in the specification that one component is "connected," "coupled" or "joined" to another component, a third component may be "connected," "coupled," and "joined" between the first and second components, although the first component may be directly connected, coupled or joined to the second component.

First, a secure payment system and method using a portable terminal and an accessory according to an embodiment of the present invention will be described in detail with reference to FIGS. 1 to 8. Hereinafter, the portable terminal is used as a meaning which is the same as a portable communication terminal.

Figure 1:
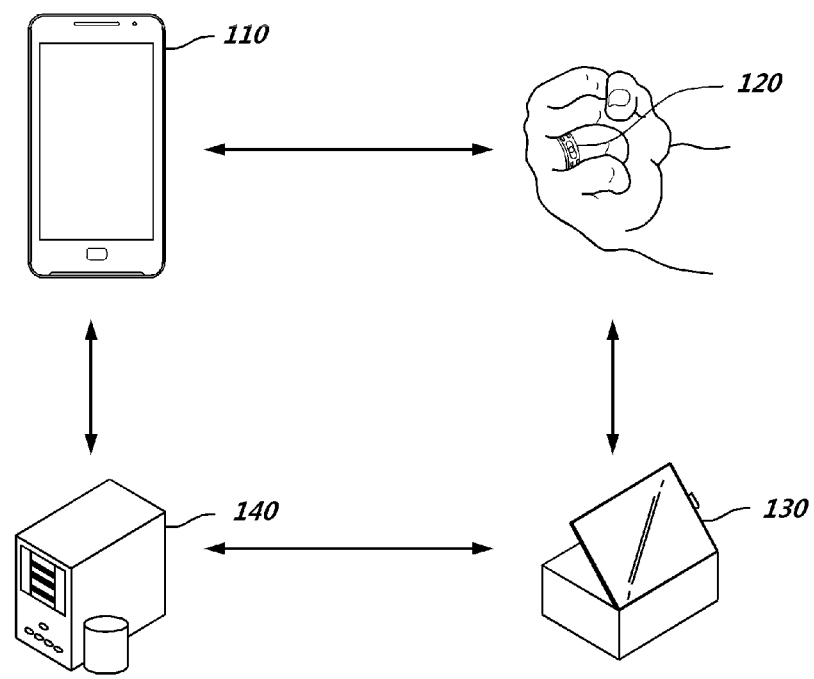
FIG. 1 illustrates a schematic configuration of a secure payment system according to an embodiment of the present invention.

FIG. 1 illustrates a schematic configuration of a secure payment system according to an embodiment of the present invention.

Referring to FIG. 1, the secure payment system includes a portable terminal 110 and an accessory 120.

The portable terminal 110 registers a registered accessory and provides payment information including at least one of a limited number of payments or a payment available time to the accessory 120. At this time, the portable terminal 110 may receive and count payment messages informing that the payment has been completed from a payment server 140 to identify whether the limited number of payments is exceeded.

The accessory 120 makes payment through a Point Of Sale (POS) device 130 by using the provided payment information. When the limited number of payments is exceeded or the payment available time is exceeded, the payment information is discarded. When a disconnection of the accessory 120 is detected, the payment information is discarded and thus the secure payment is possible. At this time, the accessory 120 may be a ring, a bracelet, a watch, a necklace or the like that can store payment information and make payment through short-range communication.

Figure 2:
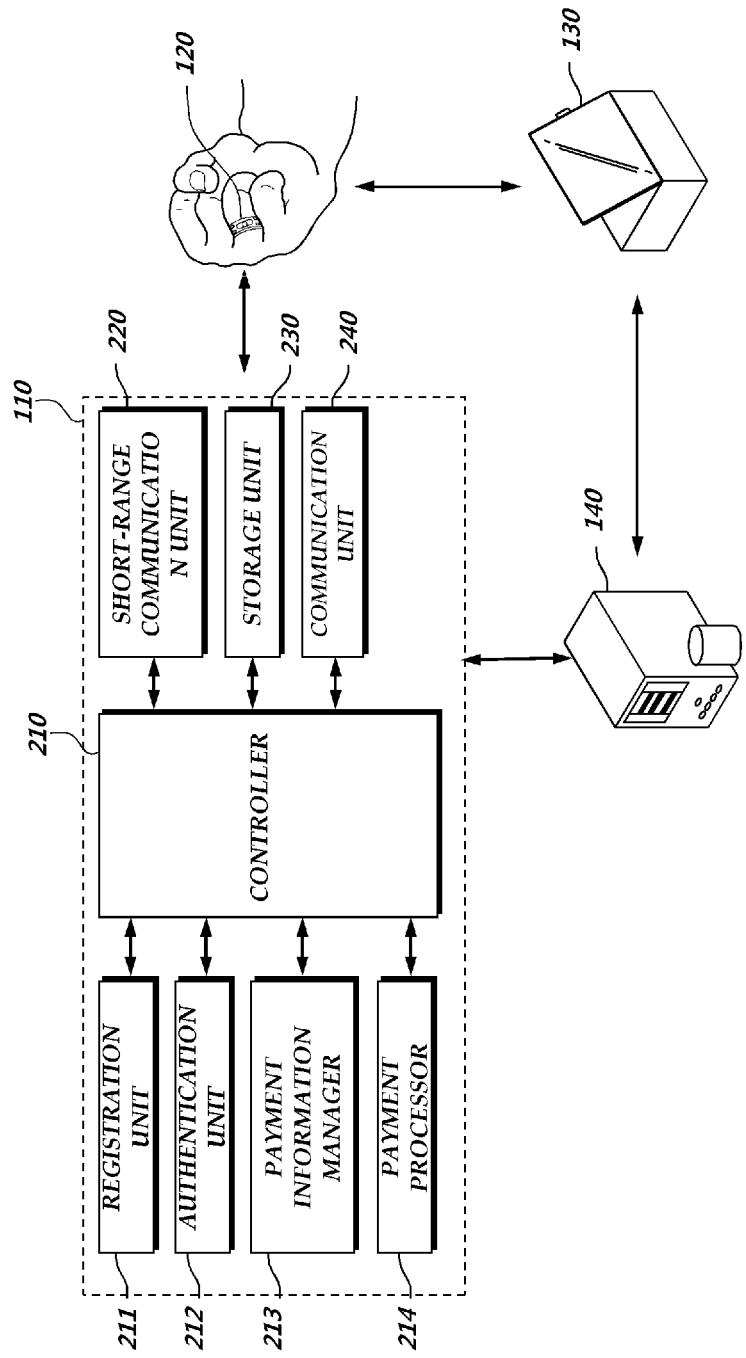
FIG. 2 illustrates a configuration of a portable terminal in a secure payment system according to an embodiment of the present invention.

FIG. 2 illustrates a configuration of the portable terminal in the secure payment system according to an embodiment of the present invention.

Referring to FIG. 2, the portable terminal 110 may include a controller 210, a registration unit 211, an authentication unit 212, a payment information manager 213, a payment processor 214, a short-range communication unit 220, a storage unit 230, and a communication unit 240.

The short-range communication unit 220 is connected to the accessory 120 through short-distance communication and transmits/receives data. Further, the short-range communication unit 220 may be connected to the POS device 130 through short-range wireless communication and transmit/receive data. At this time, the used short-range wireless communication may include WiFi, Bluetooth, Near Field Communication (NFC), and infrared communication. Further, when the short-range communication 220 attempts the short-range communication, the short-range communication unit 220 may be connected to the accessory 120 and the POS device 130 by using different communication schemes. That is, the short-range communication 220 may perform the short-range communication by using a plurality of communication techniques. For example, the short-range communication unit 220 may perform the short-range communication with the accessory 120 through Bluetooth and the short-range communication with the POS device 130 through NFC.

The storage unit 230 may store an operating system, an application program, and data for storage (phone number, Short Message Service (SMS) message, compressed image file, dynamic image and the like) for controlling a general operation of the portable terminal 110 and also store authentication information for authenticating the accessory 120 and payment information required for the payment according to the present invention.

The communication unit 240 may communicate with the payment server 140 which processes the payment and receive a payment history.

The registration unit 211 stores authentication information for an authentication with the accessory 120 in the storage unit 230 and registers the authentication information.

When payment information is requested from the accessory 120, the authentication unit 212 identifies whether the accessory 120 is the accessory 120 which has been normally registered in the portable terminal 110. At this time, an authentication method may include various methods such as a method of using a public key and a method of pre-registering a preset secret key.

As a result of the authentication by the authentication unit 212, when the authentication is successful, the payment information manager 213 transmits payment information including at least one of a limited number of payments and a payment available time to the accessory 120. At this time, the transmitted payment information is minimal information required for the payment.

The payment processor 214 limits a payment function of the portable terminal 110 until the limited number of payments or the payment available time is exceeded. At this time, the payment processor 214 may receive and count a payment message informing that the payment has been completed from the payment server to identify whether the limited number of payments is exceeded.

When a request for discarding the payment function of the accessory 120 is received before the limited number of payments or the payment available time is exceeded, the payment information manager 213 may make a request for discarding the payment information to the accessory 120.

When a discardment message informing that the payment information has been discarded is received from the accessory 120, the payment processor 214 may release the limit of the payment function of the portable terminal 110.

When the request for discarding the payment function of the accessory 120 is received before the limited number of payments or the payment available time is exceeded, the payment processor 214 may transmits a blocking message to the payment server 140 to block the payment through the accessory 120. Then, when a blocking response message informing that the blocking has been completed is received from the payment server 140 in response to the blocking message, the payment processor 214 may release the limit of the payment function of the portable terminal 110.

Meanwhile, the payment processor 214 may limit the payment when the payment is possible through the accessory 120 and may allow the payment when the payment is not possible through the accessory 120. However, in order to prevent a risk that a payment which a user does not want is generated, the payment processor 214 may maintain the limit of the payment of the portable terminal 110 by allowing the payment using only the accessory 120. That is, when the user configures such that the payment can be performed using only the accessory for security, the payment cannot be performed in the portable terminal 110 even though the accessory 120 does not have the payment information.

The controller 210 may control a general operation of the portable terminal 110. Further, the controller 210 may perform functions of the registration unit 211, the authentication unit 212, the payment information manager 213, and the payment processor 214. The discrimination between the controller 210, the registration unit 211, the authentication unit 212, the payment information manager 213, and the payment processor 214 is for distinguishing and describing respective functions. Accordingly, the controller 210 may include at least one processor configured to perform a function of each of the registration unit 211, the authentication unit 212, the payment information manager 213, and the payment processor 214. Further, the controller 210 may include at least one processor configured to perform a part of the function of each of the registration unit 211, the authentication unit 212, the payment information manager 213, and the payment processor 214.

Figure 3:
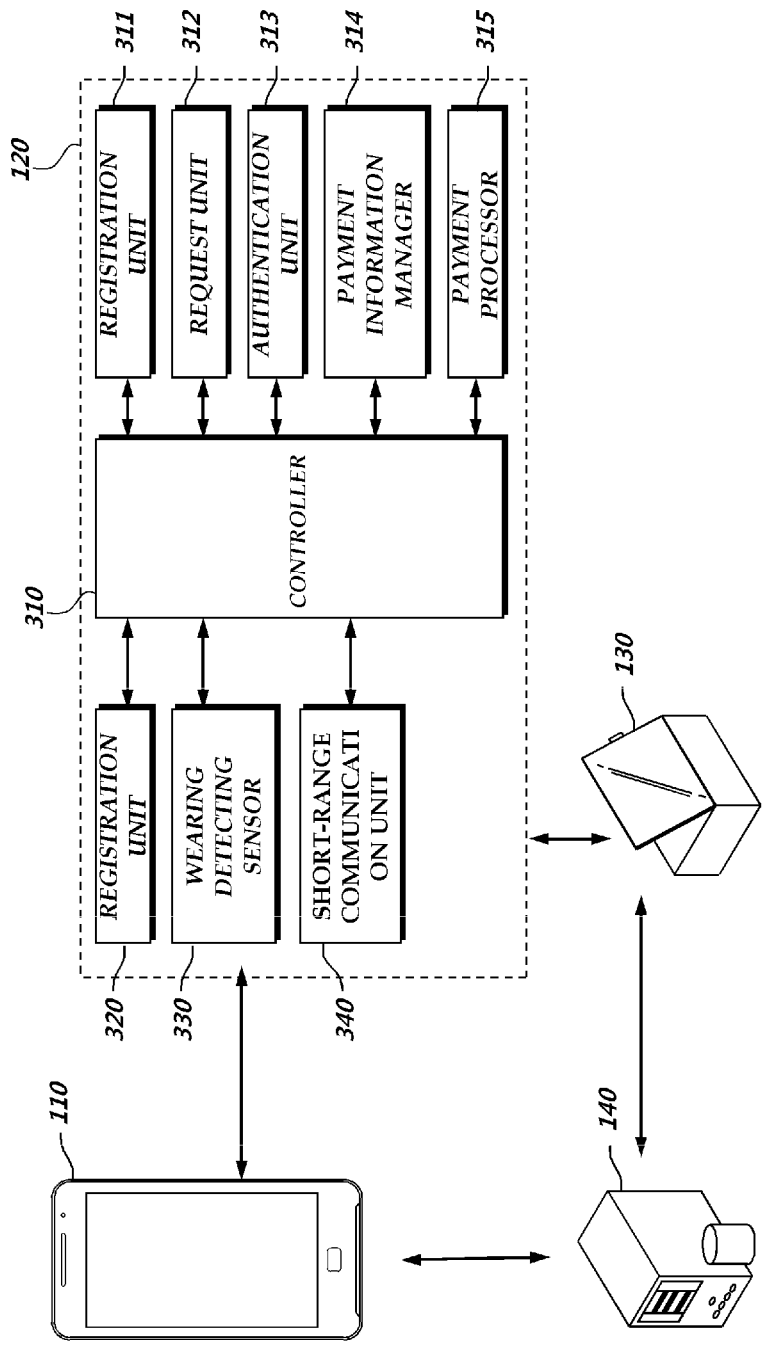
FIG. 3 illustrates a configuration of an accessory in a secure payment system according to an embodiment of the present invention.

FIG. 3 illustrates a configuration of the accessory in the secure payment system according to an embodiment of the present invention.

Referring to FIG. 3, the accessory 120 may include a controller 310, a registration unit 311, a request unit 312, an authentication unit 313, a payment information manager 314, a payment processor 315, a storage unit 320, a wearing detecting sensor 330, and a communication unit 340.

The storage unit 320 may store an operating system and an application program for controlling a general operation of the accessory 120 and also store payment information when receiving authentication information for an authentication and the payment information according to the present invention.

The wearing detecting sensor 330 detects wearing or a taking off of the accessory 120. At this time, in a method of detecting the taking off, the taking off of the accessory 120 may be detected according to whether a buckle is locked or detected according to whether the accessory 120 contacts skin.

The short-range communication unit 340 is connected to the portable terminal 110 and the POS device 130 through short-range communication to transmit/receive data.

The registration unit 311 stores authentication information for an authentication with the portable terminal 110 in the storage unit 320 and registers the authentication information.

When a request by the user of the accessory 120 is detected, the request unit 312 makes a request for payment information to the portable terminal 110. At this time, the request by the user of the accessory 120 may be detected using an input device such as a separate button.

The authentication unit 313 identifies whether the accessory 120 is the accessory 120 which has been normally registered in the portable terminal 110. At this time, an authentication method may include various methods such as a method of using a public key and a method of pre-registering a preset secret key.

As a result of the authentication by the authentication unit 313, when the authentication is successful, the payment information manager 314 receives payment information including at least one of a limited number of payments or a payment available time from the portable terminal 110 and stores the payment information. When the limited number of payments or the payment available time is exceeded, the payment information manager 314 removes the payment information.

When a request for discarding the payment information is received from the portable terminal 110 before the limited number of payments or the payment available time is exceeded, the payment information manager 314 may discard the stored payment information.

When the taking off of the accessory 120 is detected before the limited number of payments or the payment available time is exceeded, the payment information manager 314 may discard the stored payment information.

After removing the payment information, the payment information manager 314 may transmit a discardment completion message informing that the payment information has been discarded to the portable terminal 110 if short-range communication is possible with the portable terminal 110.

The payment processor 315 detects generation of a payment event. When the payment event is generated, the payment processor 315 identifies whether the payment information exists. When the payment information exists, the payment processor 315 makes payment by using the payment information. Further, when the short-range communication with the portable terminal 110 is possible, the payment processor 315 may transmit a payment history to the portable terminal 110.

The controller 310 may control a general operation of the accessory 120. Further, the controller 310 may perform functions of the registration unit 311, the authentication unit 312, the payment information manager 314, and the payment processor 315. The discrimination between the controller 310, the registration unit 311, the request unit 312, the authentication unit 313, the payment information manager 314, and the payment processor 315 is for distinguishing and describing respective functions. Accordingly, the controller 310 may include at least one processor configured to perform a function of each of the registration unit 311, the request unit 312, the authentication unit 313, the payment information manager 314, and the payment processor 315. Further, the controller 310 may include at least one processor configured to perform a part of the function of each of the registration unit 311, the request unit 312, the authentication unit 313, the payment information manager 314, and the payment processor 315.

Hereinafter, a secure payment method using the portable terminal and the accessory which are configured as described above will be described with reference to the drawings below.

Figure 4:
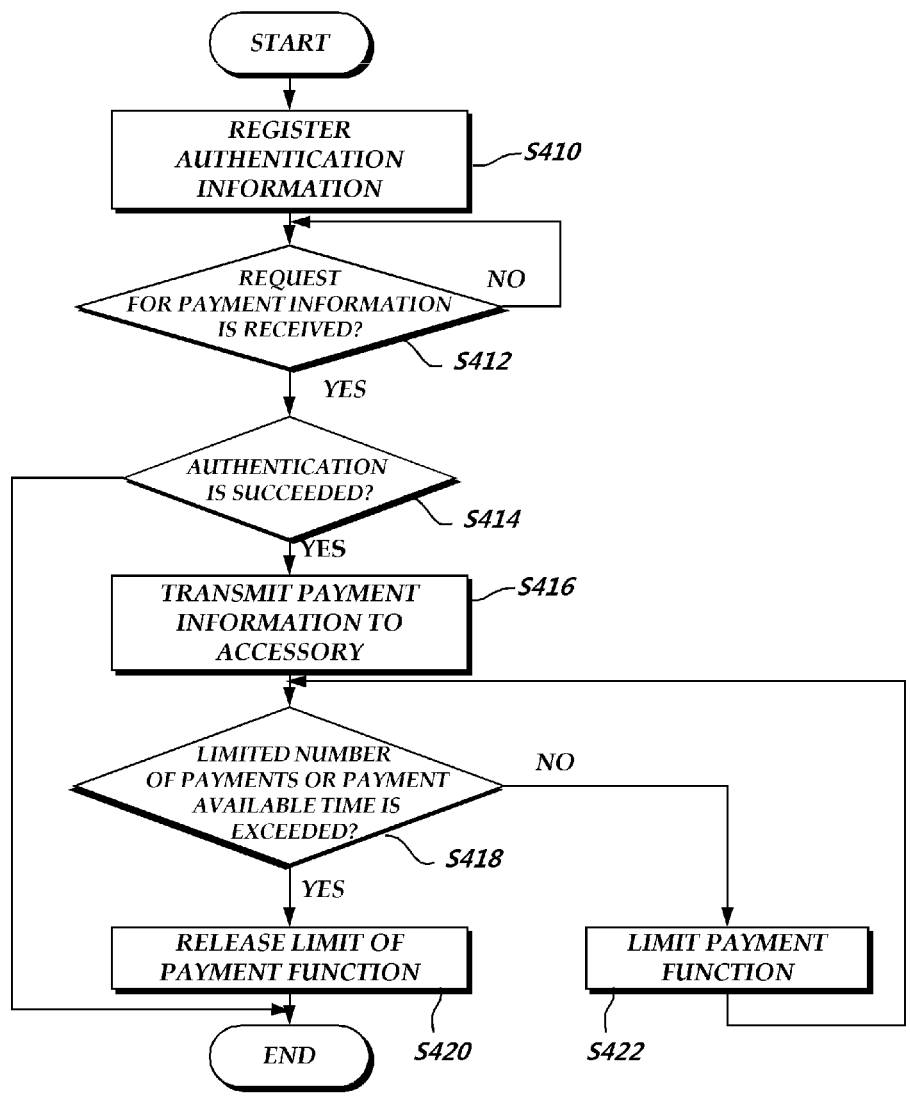
FIG. 4 is a flowchart illustrating a process in which a portable terminal performs a secure payment by using an accessory according to an embodiment of the present invention.

FIG. 4 is a flowchart illustrating a process in which the portable terminal performs a secure payment by using the accessory according to an embodiment of the present invention.

Referring to FIG. 4, the portable terminal 110 registers authentication information for an authentication with the accessory 120 in step S410.

Further, when the portable terminal 110 receives payment information from the accessory 120 in step S412, the portable terminal 110 identifies whether the accessory 120 is the accessory 120 which has been normally registered in the portable terminal 110 in step S414.

When the authentication is succeeded in step S414, the portable terminal 110 transmits payment information including at least one of a limited number of payments or a payment available time to the accessory 120 in step S416.

Further, the portable terminal 110 identifies whether the limited number of payments or the payment available time is exceeded in step S416.

As a result of the identification in step S416, when the limited number of payments and the payment available time are not exceeded, the portable terminal 110 limits a payment function of the portable terminal 110 not to allow the payment using the portable terminal 110 to be performed in step S422. That is, the portable terminal may prevent a risk that an unwanted payment is generated through the portable terminal 110 by blocking the payment function while the accessory 120 makes payment with the payment information.

Meanwhile, in a case where it is identified only whether the limited number of payments is exceeded in step S416, when the limited number of payments is not exceeded, the portable terminal 110 may limit the payment function of the portable terminal 110 not to allow the payment using the portable terminal 110 to be performed. At this time, the case where it is identified only whether the limited number of payments is exceeded in step S416 corresponds to a case where the payment information includes only the limited number of payments as information for the payment limit.

Further, in a case where it is identified only whether the payment available time is exceeded in step S416, when the payment available time is not exceeded, the portable terminal 110 may limit the payment function of the portable terminal 110 not to allow the payment using the portable terminal 110 to be performed. At this time, the case where it is identified only whether the payment available time is exceeded in step S416 corresponds to a case where the payment information includes only the payment available time as information for the payment limit.

As a result of the identification in step S416, when the limited number of payments or the payment available time is exceeded, the portable terminal 110 may limit the payment function of the portable terminal 110 to allow the payment using the portable terminal 110 to be performed in step S420. That is, in a state where the payment using the accessory 120 cannot be performed, the limit of the payment function of the portable terminal 110 is released again and thus the payment using the portable terminal 110 becomes possible.

Meanwhile, the portable terminal 110 may receive and count payment messages informing that the payment has been completed from the payment server 140 that processes the payment to identify whether the limited number of payments is exceeded.

Figure 5:
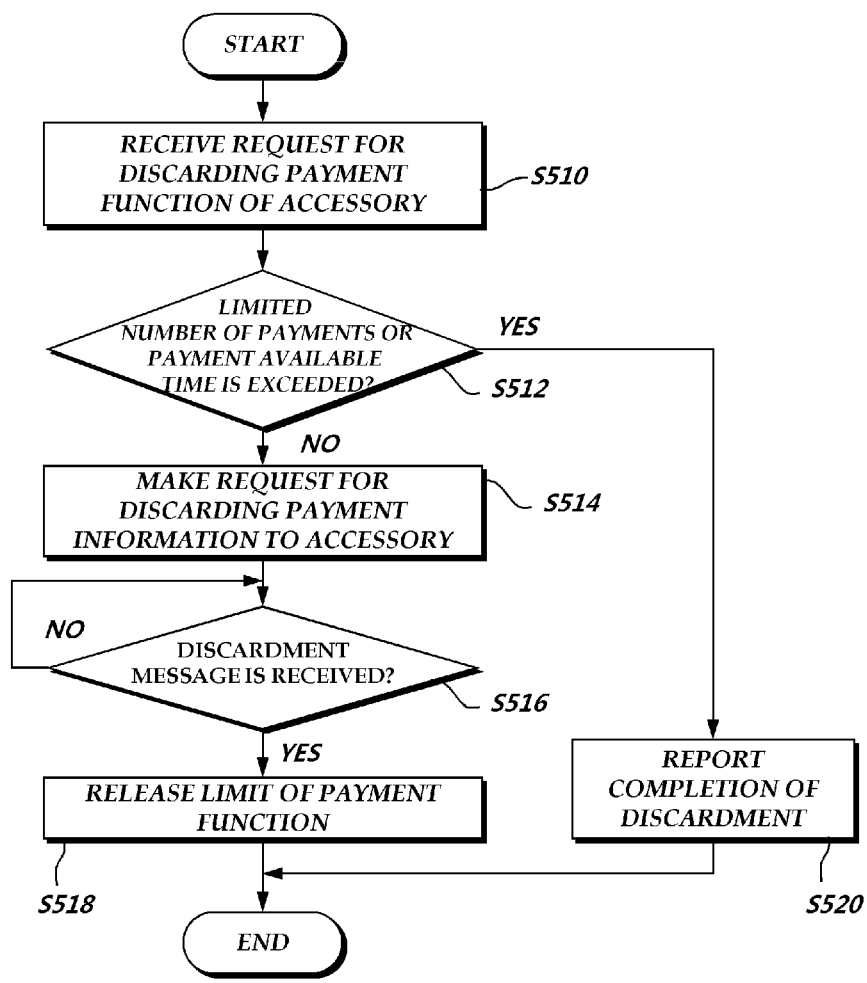
FIG. 5 is a flowchart illustrating an example in which a portable terminal according to an embodiment of the present invention discards payment information of an accessory.

FIG. 5 is a flowchart illustrating an example in which the portable terminal according to an embodiment of the present invention discards payment information of the accessory.

Referring to FIG. 5, when the portable terminal 110 receives a request for discarding a payment function of the accessory from the user in step S510, the portable terminal 110 identifies whether a limited number of payments or a payment available time is exceeded in step S512.

As a result of the identification in step S512, when the limited number of payments and the payment available time are not exceeded, the portable terminal 110 makes a request for discarding the payment information to the accessory 120 in step S514.

Meanwhile, in a case where it is identified only whether the limited number of payments is exceeded in step S512, when the limited number of payments is not exceeded, the portable terminal 110 may make a request for discarding the payment information to the accessory in step S514.

Further, in a case where it is identified only whether the payment available time is exceeded in step S512, when the payment available time is not exceeded, the portable terminal 110 may make a request for discarding the payment information to the accessory in step S514.

Thereafter, when the portable terminal 110 receives a discardment message informing that the payment information has been discarded from the accessory 120 in step S516, the portable terminal 110 releases the limit of the payment function of the portable terminal 110.

As a result of the identification in step S512, when the limited number of payments or the payment available time is exceeded, the portable terminal 110 displays a discardment completion of the payment information in step S520.

Figure 6:
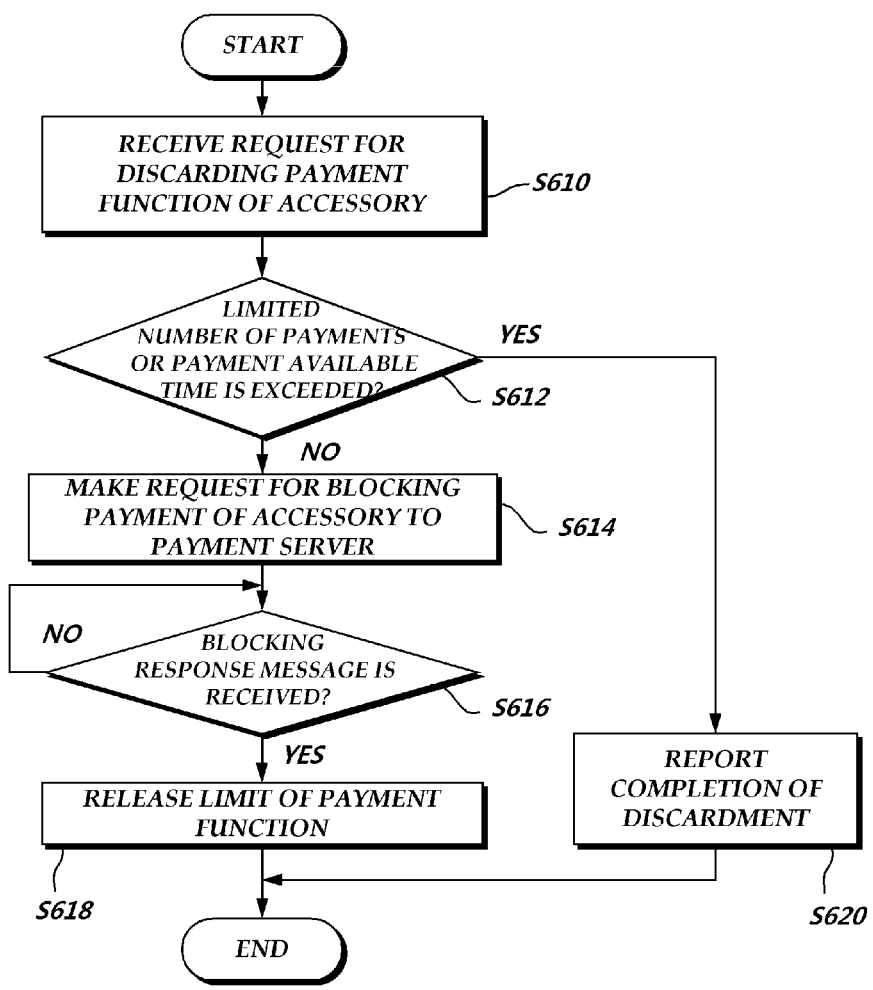
FIG. 6 is a flowchart illustrating another example in which the portable terminal discards payment information of the accessory according to an embodiment of the present invention.

FIG. 6 is a flowchart illustrating an example in which the portable terminal according to an embodiment of the present invention discards payment information of the accessory.

Referring to FIG. 6, when the portable terminal 110 receives a request for discarding a payment function of the accessory from the user in step S610, the portable terminal 110 identifies whether a limited number of payments or a payment available time is exceeded in step S612.

As a result of the identification in step S612, when the limited number of payments and the payment available time are not exceeded, the portable terminal 110 transmits a blocking message for blocking the payment to the payment server 140 in step S614.

Meanwhile, in a case where it is identified only whether the limited number of payments is exceeded in step S612, when the limited number of payments is not exceeded, the portable terminal 110 may transmit the blocking message for blocking the payment to the payment server 140 in step S614.

Further, in a case where it is identified only whether the payment available time is exceeded in step S612, when the payment available time is not exceeded, the portable terminal 110 may transmit the blocking message for blocking the payment to the payment server 140 in step S614.

Thereafter, when the portable terminal 110 receives a blocking response message informing that the payment has been blocked from the payment server 140 in response to the blocking message in step S616, the portable terminal 110 releases the limit of the payment function of the portable terminal 110.

As a result of the identification in step S612, when the limited number of payments or the payment available time is exceeded, the portable terminal 110 displays a discardment completion of the payment information in step S620.

Figure 7:
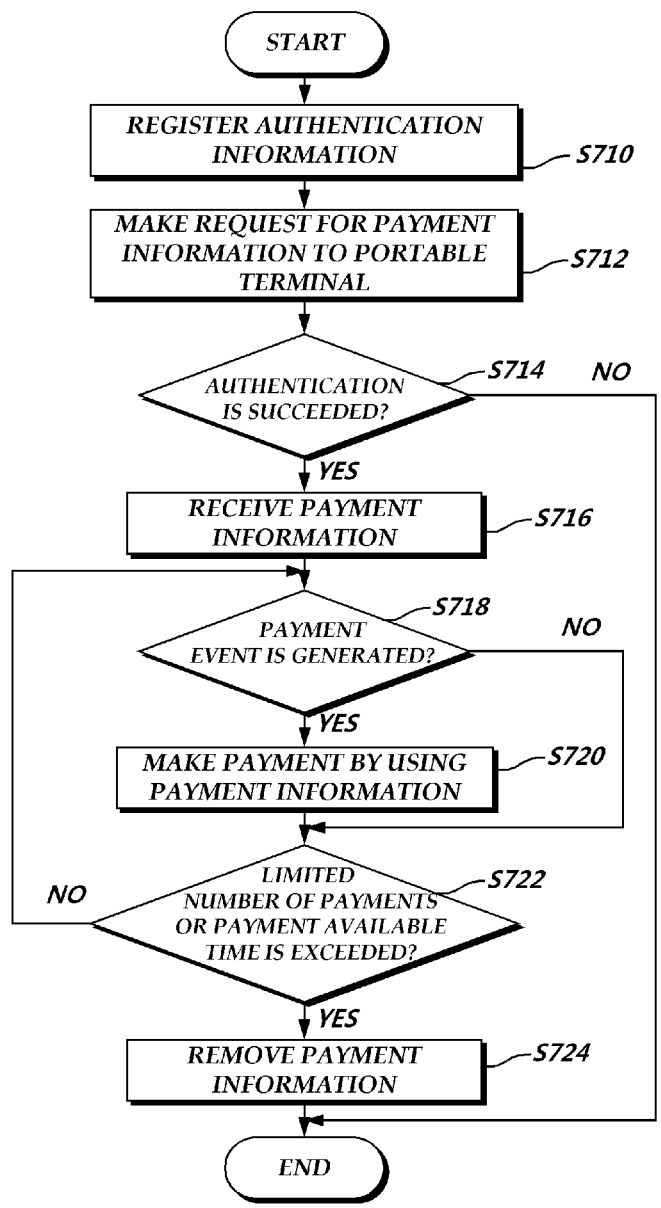
FIG. 7 is a flowchart illustrating a process in which an accessory receives payment information and performs a secure payment according to an embodiment of the present invention.

FIG. 7 is a flowchart illustrating a process in which the accessory according to an embodiment of the present invention receives payment information and performs a secure payment.

Referring to FIG. 7, the accessory 120 registers authentication information for an authentication with the portable terminal 110 in step S710. Further, the accessory 120 makes a request for payment information to the portable terminal 110 in step S712.

In addition, the accessory 120 identifies whether the accessory 120 is the accessory 120 which has been normally registered in the portable terminal 110 in step S714.

When the authentication is succeeded in step S710, the accessory 120 receives payment information including at least one of a limited number of payments or a payment available time from the portable terminal 110 in step S716.

Thereafter, when generation of a payment event is detected in step S718, the accessory 120 makes payment by using the payment information in step S720. Further, the accessory 120 identifies whether the limited number of payments or the payment available time is exceeded in step S722.

As a result of the identification in step S722, when the limited number of payments and the payment available time are not exceeded, the accessory 120 returns to step S718.

Meanwhile, in a case where it is identified only whether the limited number of payments is exceeded in step S722, when the limited number of payments is not exceeded, the accessory 120 may return to step S718.

Further, in a case where it is identified only whether the payment available time is exceeded in step S722, when the payment available time is not exceeded, the accessory 120 may return to step S718.

As a result of the identification in step S722, when the limited number of payments or the payment available time is exceeded, the accessory 120 removes the payment information in step S724.

Figure 8:
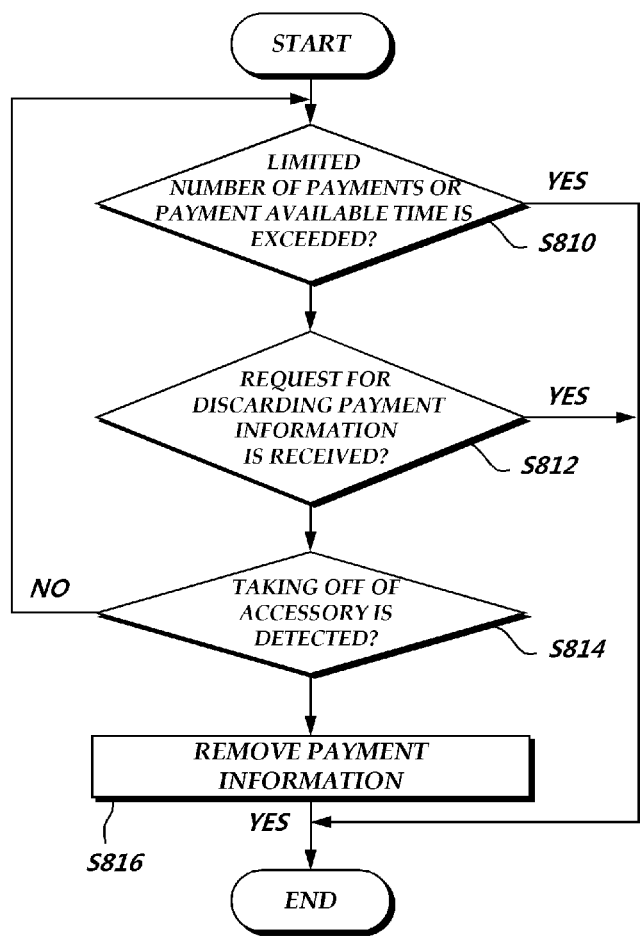
FIG. 8 is a flowchart illustrating a process in which an accessory discards payment information according to an embodiment of the present invention.

FIG. 8 is a flowchart illustrating a process in which the accessory according to an embodiment of the present invention discards payment information.

Referring to FIG. 8, the accessory 120 identifies whether the limited number of payments or the payment available time is exceeded in step S810.

As a result of the identification in step S810, when the limited number of payments and the payment available time are not exceeded, the accessory 120 identifies whether a request for discarding payment information is received in step S812.

Meanwhile, in a case where it is identified only whether the limited number of payments is exceeded in step S810, when the limited number of payments is not exceeded, the accessory 120 may identify whether the request for discarding the payment information is received in step S812.

Further, in a case where it is identified only whether the payment available time is exceeded in step S810, when the payment available time is not exceeded, the accessory 120 may identify whether the request for discarding the payment information is received in step S812.

As a result of the identification in step S812, when the accessory 120 does not receive the request for discarding the payment information, the accessory 120 identifies whether a taking off of the accessory is detected in step S814.

As a result of the identification in step S814, when the taking off of the accessory is not detected, the accessory 120 returns to step S810.

When the limited number of payments or the payment available time is exceeded as a result of the identification in step S810, when the request for discarding the payment information is received as a result of the identification in step S812, or when the taking off of the accessory 120 is detected as a result of the identification in step S814, the accessory 120 discards the stored payment information in step S816.

Figure 9:
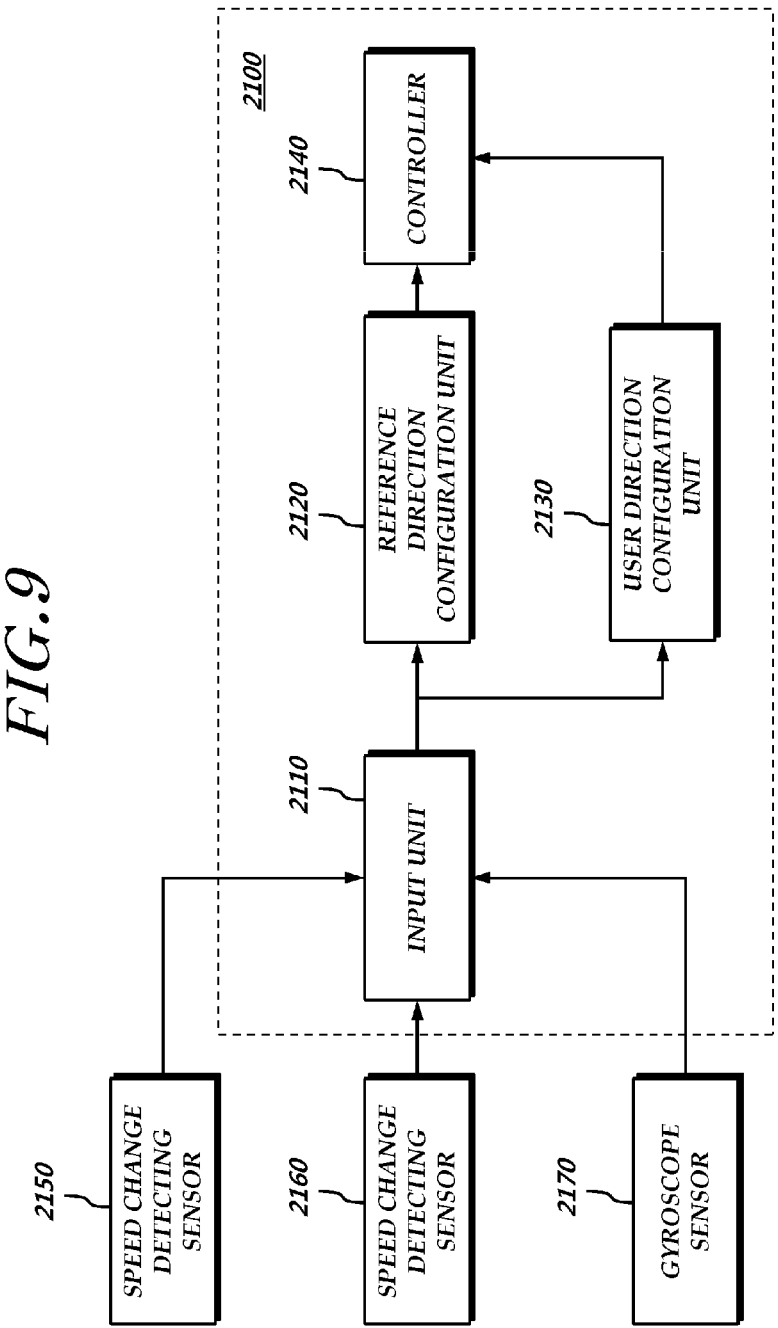
FIG. 9 is a block diagram of an apparatus for controlling a smart watch according to an embodiment of the present invention.

FIG. 9 is a block diagram of an apparatus 2100 for controlling a smart watch according to an embodiment of the present invention.

The apparatus 2100 for controlling the smart watch according to the embodiment of the present invention may include an input unit 2110 that receives position change information obtained from one or more of a speed change detecting sensor 2150, an tilt sensor 2160, and a gyroscope sensor 2170, a reference direction configuration unit 2120 that calculates normal vector direction information of a display displaying contents based on the position change information and then configures and stores the normal vector direction information as a reference direction value, a user direction configuration unit 2130 that calculates and configures a forward direction value in a direction of user's eyes based on the position change information, and a controller 2140 that controls an operation of the smart watch based on the reference direction value and the forward direction value.

Referring to FIG. 9, the apparatus 2100 for controlling the smart watch according to the embodiment of the present invention may include the input unit 2110 which receives a measurement result from one or more sensors which measure a rotation, a slope, and an angle change of the smart phone including the speed change detecting sensor 2150 that may detect a speed change of the smart watch such as an acceleration sensor, the tilt sensor 2160 that measures an inclination degree of the smart watch such as a gravity sensor, and the gyroscope sensor 2170.

Further, the apparatus 2100 for controlling the smart watch includes the reference direction configuration unit 2120 that receives position change information of the smart watch from the input unit 2110, calculates a normal vector direction of a display unit such as a display which may display contents in the smart watch, and configures information on the normal vector direction as the reference direction value of the smart watch to update and store the information.

The information on the normal vector direction may refer to information on a direction making a right angle with a surface of the display displaying contents of the smart watch. For example, when the smart watch is worn on a wrist of the user, a normal vector direction corresponding to an external direction, not a direction in which the wrist contacts the smart watch may be configured as the reference direction value.

The reference direction value may be configured as a vector value for a direction or configured as a coordinate value indicating a direction on the space.

Further, the user direction configuration unit 2130 may receive the position change information and calculate and store a forward direction value in a direction of user's eyes.

More specifically, for example, the forward direction value in the direction of the user's eyes may be configured as information on a movement pattern and a forward direction of the user pre-configured and stored according to the movement pattern. The movement pattern of the smart watch is calculated based on the position change information of the smart watch.

The forward direction value may be configured as a vector value for a direction or configured as a coordinate value indicating a direction on the space.

For example, the controller 2140 receives a reference direction value of the smart watch from the reference direction configuration unit 2120 and a forward direction value of the user from the user direction configuration unit 2130 to calculate a difference between the two values. Through the calculation, the controller 2140 may determine whether the display unit of the smart watch is within the direction of the user's eyes to control operations of various devices such as display power, a camera, and a microphone of the smart watch.

The smart watch in the specification refers to a mobile terminal which the user can wear on the body and may correspond to various devices which have a display displaying contents through communication with a base station or another terminal even if the device does not have a watch function.

Further, when the smart watch is warn on the user's wrist, the smart watch may be worn any wrist of left and right hands. Regardless of the left and right hands, the same function can be implemented through a configuration.

Figure 10:
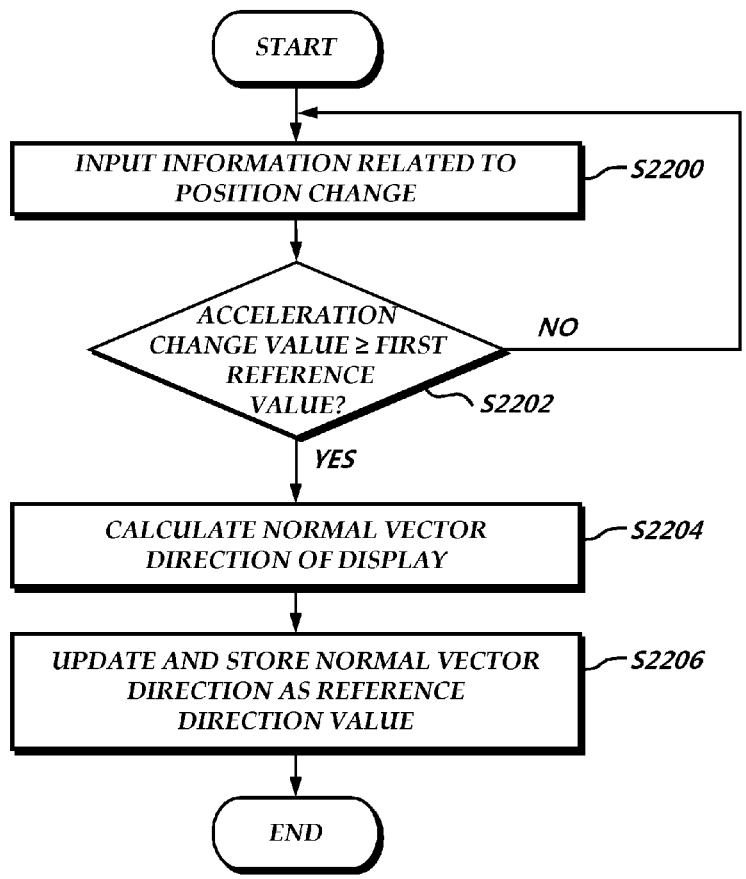
FIG. 10 is a flowchart illustrating an operation of a reference direction configuration unit according to an embodiment of the present invention.

FIG. 10 is a flowchart illustrating an operation of the reference direction configuration unit 2120 according to an embodiment of the present invention.

When an acceleration change of the smart watch is equal to or larger than a first reference value based on the position change information, the reference direction configuration unit 2120 according to the embodiment of the present invention may calculate normal vector direction information of the display and update and store the reference direction value.

Referring to FIG. 10, the reference direction configuration unit 2120 may receive information related to a position change of the smart watch from the input unit 2110 in step S2200 and may extract an acceleration change value generated by a movement of the smart watch based on speed change information and compare the extracted acceleration change value with a preset first reference value in step S2202.

For example, when it is determined that the acceleration change value of the smart watch is equal to or larger than the preset first reference value through an experiment, the reference direction configuration unit 2120 may calculate a normal vector direction of the display forming the right angle with a surface of the display of the smart watch in step S2204 and may configure the calculated normal vector direction as a reference direction value and store the configured value in step S2206.

When the acceleration change value of the smart watch is smaller than the first reference value, the reference direction configuration unit 2120 may receive information on the position change from the input unit 2110 and repeat the aforementioned steps.

Accordingly, the reference direction configuration unit 2120 may measure a change in the reference direction value by continuously calculating the normal vector direction to calculate the reference direction value when a position change of the smart watch is generated and may update and store a current reference direction value.

Further, there is an effect of reducing energy of the smart watch by measuring the normal vector direction and configuring the reference direction value only when the acceleration change equal to or larger than a predetermined value is generated.

Figure 11:
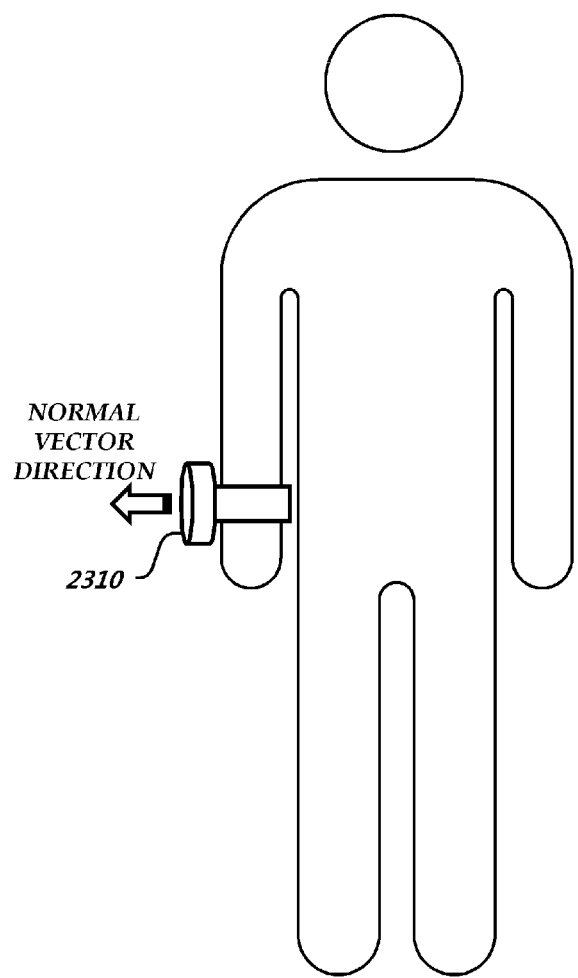
FIG. 11 illustrates an example of a reference direction of a smart watch according to an embodiment of the present invention.

FIG. 11 illustrates an example of a reference direction of a smart watch 2310 according to an embodiment of the present invention.

Referring to FIG. 11, when the smart watch 2310 is worn on a user's right wrist, a direction forming a right angle with a surface of the display displaying contents is a normal vector direction of the smart watch 2310. When normal vector direction information is calculated, a reference direction value may be determined based on the normal vector direction information.

For example, when an acceleration value of a movement of a user's arm or a movement of the smart watch is equal to or larger than a first reference value after the normal vector direction is calculated and then the reference direction value is configured, the reference direction configuration unit 2120 may calculate a normal vector direction to configure a new reference direction value.

Figure 12:
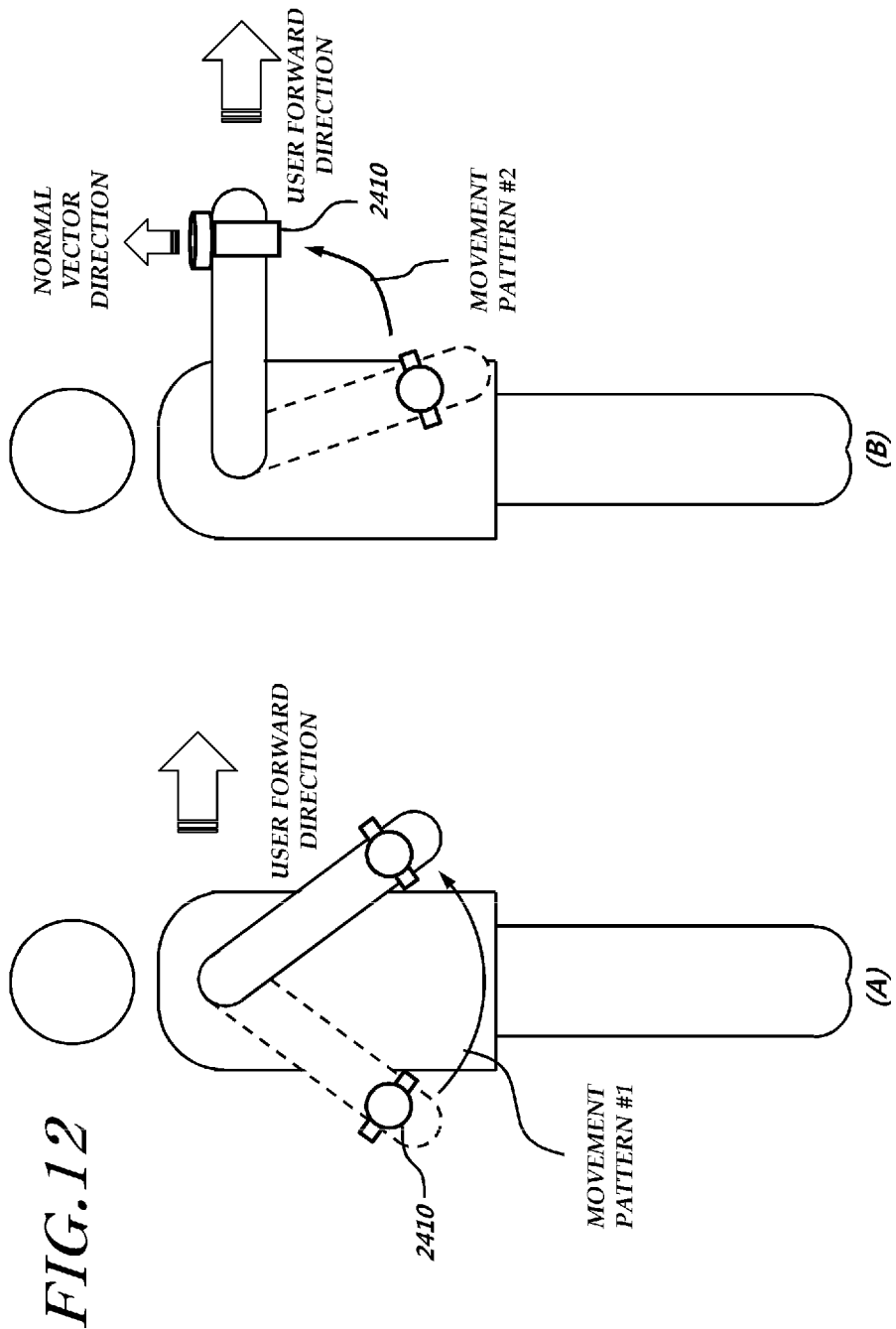
FIG. 12 illustrates an example in which a user direction configuration unit according to an embodiment of the present invention configures a user forward direction according to a movement pattern.

FIG. 12 illustrates an example in which the user direction configuration unit 2130 according to an embodiment of the present invention configures a user forward direction according to a movement pattern.

The user direction configuration unit 2130 according to an embodiment of the present invention may calculate a movement pattern of a smart watch 2410 based on position change information, compare the movement pattern with user forward direction information configured and stored for each movement pattern of the smart watch 2410, and configure stored particular forward direction information mapped with the movement pattern of the smart watch 2410 as a user forward direction value.

Further, the user forward direction information configured and stored for each movement pattern of the smart watch 2410 according to an embodiment of the present invention may be a preset value or a value set and stored according to user movement pattern input information.

Referring to FIG. 12, for example, the user direction configuration unit 2130 may receive position change information of the smart watch from the input unit 2110 and calculate movement pattern #1 of the smart watch 2410 as illustrated in FIG. 12A.

In this case, when movement pattern #1 of the smart watch 2410 is generated as illustrated in FIG. 12A, the user direction configuration unit 2130 may recognize it as a situation where the user walks forward and may configure a direction in which the user walks as a user forward direction based on movement pattern #1 and acceleration change information.

Further, the user direction configuration unit 2130 may configure a user forward direction value by identifying pre-stored user forward direction information mapped with movement pattern #1.

In this case, the smart watch 2410 generates limited movement patterns due to physical limits such as a joint turning radius and a joint bending direction of a wrist and an elbow by the wearing of the smart watch 2410.

Accordingly, when movement pattern #1 is generated based on user forward direction information according to preset movement patterns, the user direction configuration unit 2130 may search for user forward direction information mapped with movement pattern #1 and configure the user forward direction information as a user forward direction value.

For example, when a user movement pattern is not generated, the 6 o'clock direction may be configured as a user forward direction in a state where the user lowers his/her arm.

Referring to FIG. 12B, user forward direction information pre-mapped according to movement patterns may be a value pre-measured and configured according to a movement pattern through an experiment and may be configured and stored by user movement pattern input information generated by executing a particular movement pattern and inputting a forward direction value of the corresponding movement pattern by the user.

Referring to FIG. 12B, the user executes a movement such as movement pattern #2 to input movement pattern information and may directly input and configure a user forward direction according to a movement pattern of movement pattern #2.

In this case, movement pattern #2 is stored according to user movement pattern input information and user forward direction information which has mapped and configured with movement pattern #2 is also mapped and stored with movement pattern #2 as user forward direction information. Later, when the user executes movement pattern #2, the user direction configuration unit 2130 may configure a user forward direction value mapped according to user movement pattern input information.

As described above, when the user directly inputs a particular movement pattern, there is an effect of configuring a more accurate user forward direction value for each user. When an error in recognizing the user forward direction is generated, there is an effect of configuring an accurate reference for the user forward direction value.

Figure 13:
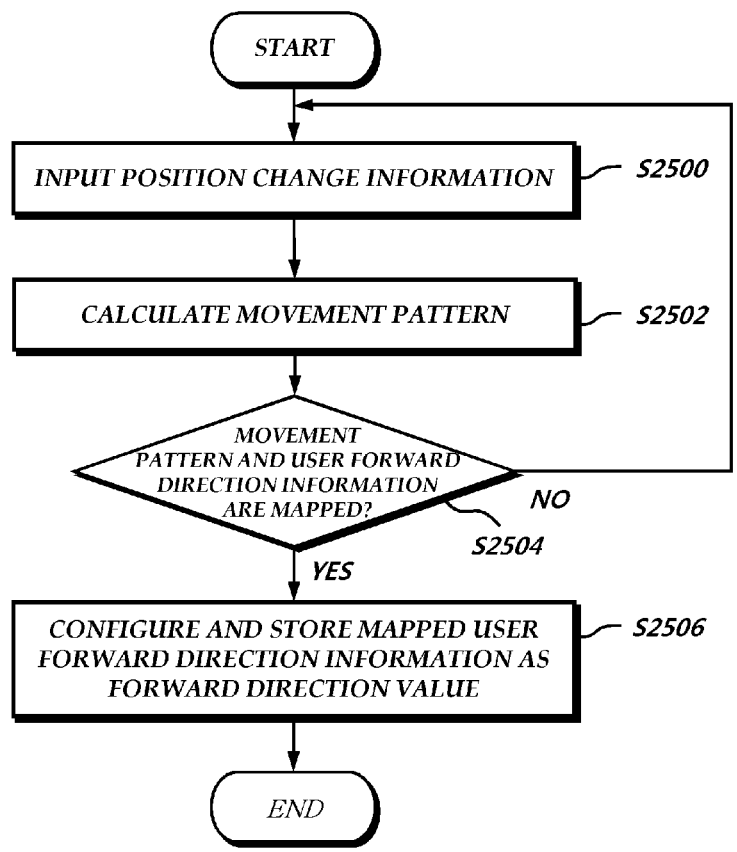
FIG. 13 is a flowchart illustrating an operation in which a user direction configuration unit according to an embodiment of the present invention configures and stores a user forward direction value according to a movement pattern.

FIG. 13 is a flowchart illustrating an operation in which the user direction configuration unit 2130 according to an embodiment of the present invention configures and stores a user forward direction value according to a movement pattern.

The user direction configuration unit 2130 according to an embodiment of the present invention receives information related to position change information from the input unit 2110 in step S2500, calculates a movement pattern of the smart watch based on the received input change information in step S2502, and then checks whether user forward direction information which has been configured according to the calculated movement pattern or configured according to user movement pattern input information is mapped in step S2504.

When there is user forward direction information mapped with the calculated movement pattern, the user direction configuration unit 2130 may configure and store the mapped user forward direction information as a forward direction value. When the forward direction value is changed, a new forward direction value is updated and stored.

However, when there is no user forward direction information mapped with the calculated movement pattern, the user direction configuration unit 2130 may receive new position change information in step S2500 and configure a forward direction value by performing the same steps.

For example, in order to increase the accuracy of the configuration of the user direction of the smart watch, the user direction configuration unit 2130 may configure a wider error range recognized when it is determined whether the movement pattern and the user forward direction information are mapped.

Figure 14:
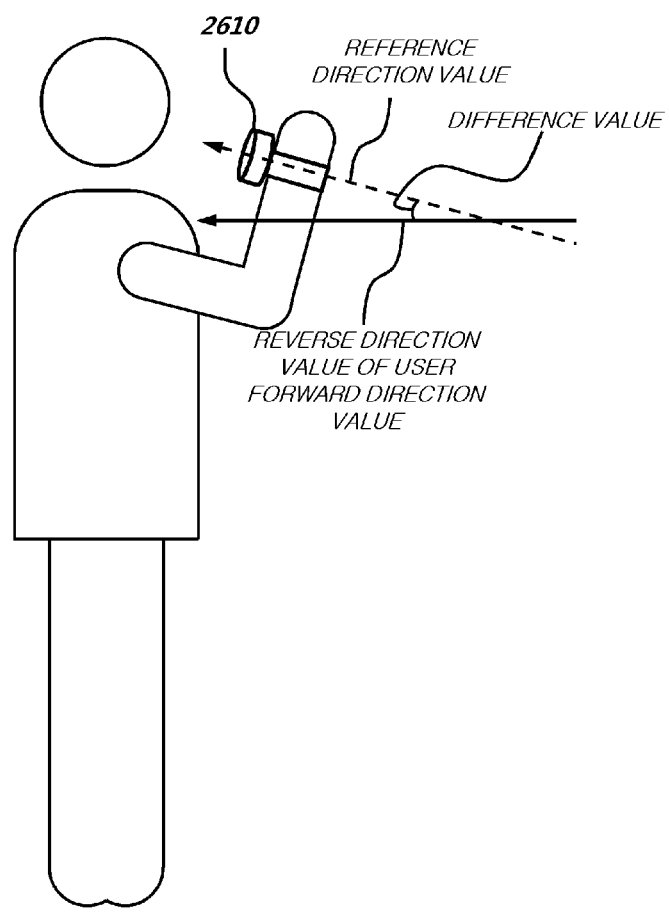
FIG. 14 illustrates an example in which a controller according to an embodiment of the present invention controls an operation of a smart watch based on a reference direction value and a user forward direction value.

FIG. 14 illustrates an example in which the controller 2140 controls an operation of a smart watch 2160 according to an embodiment of the present invention based on a reference direction value and a user forward direction value.

The controller 2140 according to an embodiment of the present invention may control to turn on the display when a difference between a reverse direction value of the forward direction value and the reference direction value is within a second reference value.

Referring to FIG. 14, for example, the controller 2140 may identify whether user's gaze direction the smart watch 2610 based on a reference direction value and a user forward direction value received from the reference direction configuration unit 2120 and the user direction configuration unit

2130. When the user's gaze direction the smart watch 2610, the controller 2140 may control to turn on the display.

Specifically, for example, the controller 2140 may calculate a reverse direction value of the user forward direction value and determine whether a difference between the reverse direction value and the reference direction value is within a preset second reference value, so as to control power of the display.

When the user makes the display of the smart watch face a user's face to view the smart watch 2610, the second reference value may be configured as an angle difference or a coordinate difference between the reverse direction value of the user forward direction and a direction of the smart watch through an experiment. The sensitivity of the operation of the display may be controlled by adjusting the preset second reference value and the second reference value may be controlled by directly inputting a configuration value of the sensitivity by the user.

Further, although not illustrated in FIG. 14, the controller 2140 according to an embodiment of the present invention may control to turn off the display when the controller receives user's eye information from a camera installed in the smart watch 2610 and the user's eyes become away from the display by a predetermined range or more for a reference time.

That is, for example, the controller 2140 receives position information on a position where the user's gaze direction from the camera installed in a front surface of the smart watch 2610. When the user's eyes escape from the periphery of the display which is configured as a predetermined range from the display, the controller 2140 may control the power of the display.

A technique for measuring the position information on the position which the user's gaze direction by the camera may measure the position information by detecting light reflected from an iris of the user or may measure a movement of pupils by optically recognizing the pupils of the user.

As described above, the controller 2140 may obtain an effect of saving power of the smart watch 2610 by additionally identifying the user's eyes through the camera. Further, even when it is determined that the smart watch is located in a direction of the user's eyes according to a movement of the user, the controller 2140 may control the smart watch to perform an accurate operation by performing the additional identification.

Although it has been described that the controller 2140 calculates the inverse direction value of the user forward direction value and determines the difference between the reverse direction value and the reference direction value, the controller 2140 may control the operation of the smart watch by determining a difference between the user forward direction value and the reference direction value for the identity of the direction.

Figure 15:
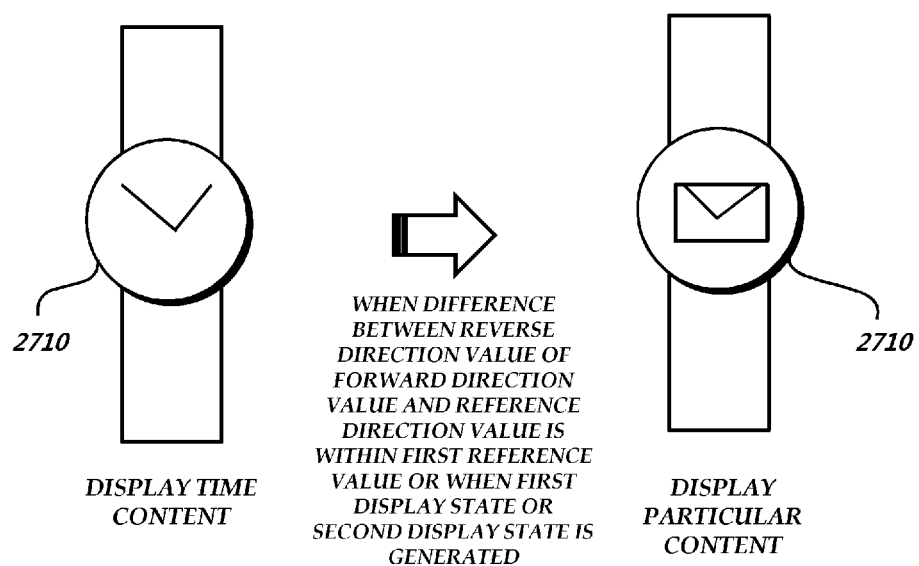
FIG. 15 illustrates an example in which a controller according to an embodiment of the present invention changes a displayed content of a smart watch based on a reference direction value and a user forward direction value.

FIG. 15 illustrates an example in which the controller 2140 according to an embodiment of the present invention changes a displayed content of the smart watch based on the reference direction value and the user forward direction value.

The controller 2140 according to an embodiment of the present invention may control to display a particular content configured from among contents on the display when a difference between the reverse direction value of the forward direction value and the reference direction value is within a third reference value.

Referring to FIG. 15, for example, when the user does not view the smart watch, the controller 2140 may control to display a time content to implement a watch function. As described above, when the difference between the reverse direction value of the user forward direction value and the reference direction value is within the preset third reference value, the controller 2140 may control to change the content displayed on the displayed 2710 of the smart watch to a preset particular content and display the changed particular content.

For example, when a message reception event is generated in a terminal such as a smart phone interworking and communicating with the smart watch, the user may recognize the generation of the event by using at least one sense of sight, hearing, and touch. When the user having recognized the generation of the event moves the smart watch in a direction of the user's eyes to identify the content of the event, the controller 2140 may control the particular content of which the event has been generated to be displayed on a display 2712 by determining whether the difference between the reverse direction value of the user forward direction value and the reference direction value is within the second reference value according to the movement.

The third reference value may be a value pre-configured and stored through an experiment, and may be configured as a value smaller or larger than the second reference value so that two cases, in one of which the user views the time content and in the other the user views a content according to a particular event, can be distinguished and displayed.

Figure 16:
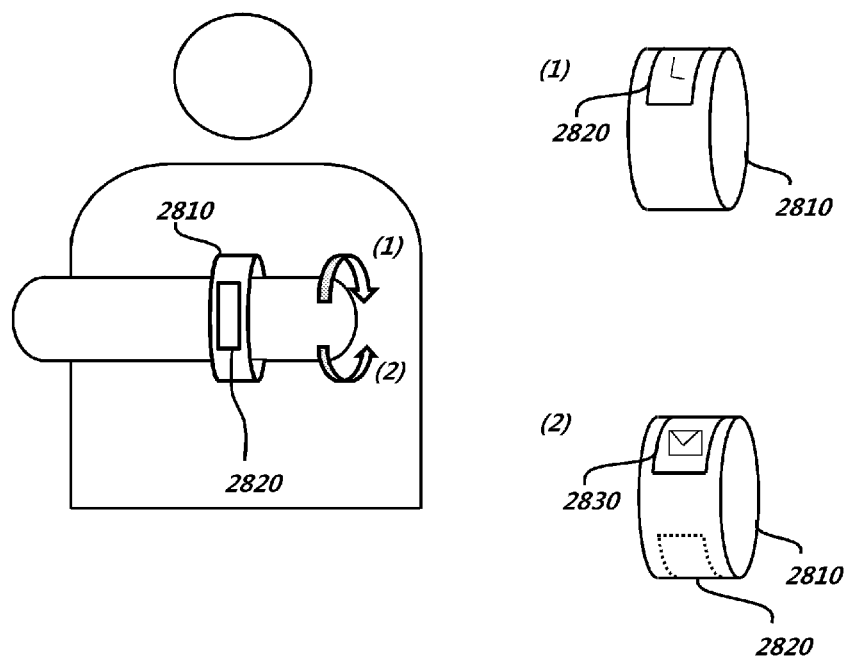
FIG. 16 illustrates an example in which a controller according to an embodiment of the present invention displays another content according to a rotation pattern of a smart watch.

FIG. 16 illustrates an example in which the controller 2140 according to an embodiment of the present invention displays different contents based on rotation pattern (1) and (2) of a smart watch 2810.

The controller 2140 according to an embodiment of the present invention may control to change at least one of a display position of the content and a information of the content displayed on displays 2820 and 2830 according to a pattern of change of the reference direction value.

Further, the controller 2140 according to an embodiment of the present invention may control to display a particular content when a particular pattern of change is generated according to a pattern of change of the reference direction value.

Referring to FIG. 16, for example, the controller 2140 may determine a pattern of change generated by a change in the reference direction value input from the reference direction configuration unit 2120 and may control to change the information of the content controlled or displayed such that the configured content display position is controlled according to each pattern of change.

For example, the reference direction value of the display of the smart watch 2810 of FIG. 16 is configured as a forward direction of the user, that is, a direction from the ground which is a normal vector direction of the display. In this case, when the user rotates the smart watch 2810 as illustrated in FIG. 16 (1), the reference direction value is changed along an arrow path of FIG. 16 (1), and a particular content such as the time content may be displayed on a first display area 2820 by measuring a rotation pattern of the reference direction value.

In contrast, when the user rotates the smart watch 2810 as illustrated in FIG. 16 (2), the reference direction value is changed along an arrow path of FIG. 16 (2), and the content may be displayed on a second display area 2830 by measuring a rotation pattern of the reference direction value. In this case, a content different from the content illustrated in FIG. 16 (1) may be displayed as well as a different content display position.

The first display area 2820 and the second display area 2830 may be areas which can be separated on the same display or separated display devices.

That is, when the user rotates the smart watch 2810 to make an outside of the wrist (wrist in a direction of the back of the hand) oriented toward the user's eyes, the controller 2140 may control to display the content on the first display area 2820 configured on the outside of the wrist. When the user rotates the smart watch 2810 in a reverse direction of the above direction to make an inside of the wrist (wrist in a direction of the palm) oriented toward the user's eyes, the controller 2140 may control to display the content on the second display area 2830.

Through such a control by the controller 2140 according to an embodiment of the present invention, the present invention has an effect in which a content related to the user's privacy is displayed on the second display area 2830 and thus the content can be prevented from being exposed to the outside.

Further, the user can conveniently identify the content regardless of a rotation direction of the smart watch since a display area of the content is changed according to the rotation.

The controller 2140 according to an embodiment of the present invention may further control an operation of a microphone installed in the smart watch based on at least one of a pattern of change of the reference direction value and a spaced distance of the user from the smart watch.

For example, when a pattern of change of the reference direction value of FIG. 16 (2) is generated, the controller 2140 may control to display a content related to a voice input on the second display area 2830 and operate the microphone installed in the smart watch through which a voice can be input.

In this case, the controller 2140 may control to operate the microphone only when the smart watch approaches within a predetermined distance from the user based on the measured spaced distance between the user and the smart watch by using a distance measuring sensor such as an ultrasonic sensor or a proximity sensor.

Hereinafter, the method of controlling the smart watch according to an embodiment of the present invention will be briefly described again with reference to FIGS. 9 to 16.

Figure 17:
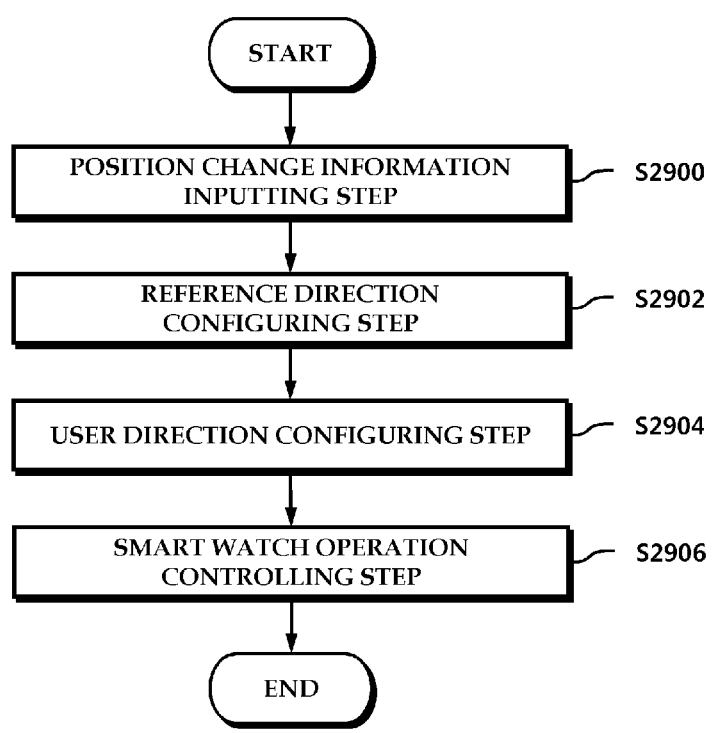
FIG. 17 is a flowchart illustrating a method of controlling a smart watch according to an embodiment of the present invention.

FIG. 17 is a flowchart illustrating a smart watch control method according to an embodiment of the present invention.

The smart watch control method according to the embodiment of the present invention may include an input step (S2900) of receiving position change information obtained from one or more of a speed change detecting sensor, an tilt sensor, and a gyroscope sensor, a reference direction configuration step (S2902) of calculating normal vector direction information of a display displaying contents based on the position change information and then configuring and storing the normal vector direction information as a reference direction value, a user direction configuration step (S2904) of calculating and configuring a forward direction value in a direction of user's eyes based on the position change information, and a control step (S2906) of controlling an operation of the smart watch based on the reference direction value and the forward direction value.

Referring to FIG. 17, the smart watch control method may include an input step (S2900) of receiving position change information obtained from one or more of a sensor detecting a speed change, a sensor detecting an tilting, and a gyroscope sensor measuring a rotation, a slope, and a position change, a configuration step (S2902) of configuring a reference direction of the smart watch based on the received position change information, a user direction configuration step (S2904) of configuring a user forward direction as a user forward direction value based on the received position changed information, and a control step (S2906) of controlling an operation of the smart watch based on the reference direction value and the user forward direction value.

Figure 18:
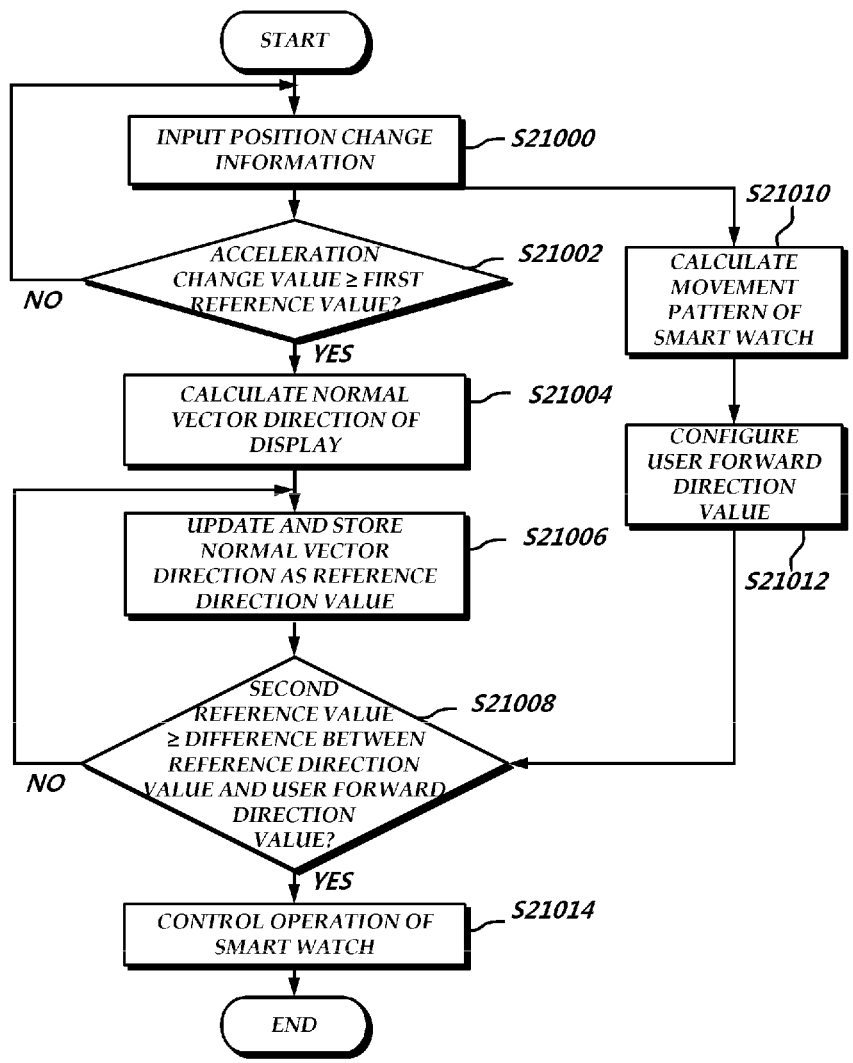
FIG. 18 is a flowchart illustrating in detail a method of controlling a smart watch according to an embodiment of the present invention.

FIG. 18 is a flowchart illustrating in detail a smart watch control method according to an embodiment of the present invention.

Referring to FIG. 18, the smart watch control method may include receiving position change information from the above described sensors in step S21000, measuring an acceleration change value of the smart watch based on the position change information and comparing the measured acceleration change value with a first reference value in step S21002, calculating a normal vector direction of a display when the acceleration change value is equal to larger than the first reference value in step S21004, and updating and storing the reference direction value in step S21006. When the acceleration change value is smaller than the first reference value as a result of the comparison in step S21002, the acceleration change may be determined again by receiving new position change information without calculating the normal vector direction in step S21002.

Further, a movement pattern of the smart watch may be calculated based on the position change information in step S21010 and then a user forward direction value may be configured according to the calculated movement pattern in step S21012.

When a difference between the reference direction value and the user forward direction value is within a second reference value in step S21008, an operation of the smart watch may be controlled in step S21014.

A recording medium recording a program for executing the smart watch control method according to the embodiment of the present invention may include a function of receiving position change information obtained from one or more of a speed change detecting sensor, an tilt sensor, and a gyroscope sensor, a function of calculating normal vector direction information of a display displaying contents based on the position change information and then configuring and storing the normal vector direction information as a reference direction value, a function of calculating and configuring a forward direction value in a direction of user's eyes based on the position change information, and a function of controlling an operation of the smart watch based on the reference direction value and the forward direction value.

Figure 19:
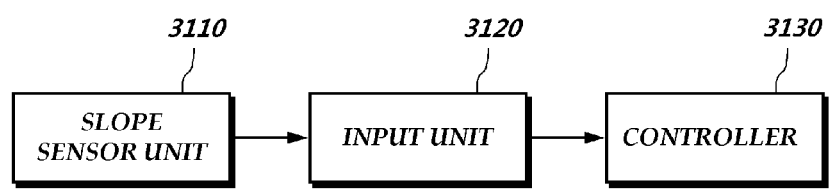
FIG. 19 is a block diagram of an apparatus for controlling a smart watch according to an embodiment of the present invention.

FIG. 19 is a block diagram of an apparatus for controlling the smart watch according to an embodiment of the present invention.

The apparatus 2100 for controlling the smart watch according to the embodiment of the present invention may include at least one slope sensor unit 3110 that detects a slope of the smart watch, an input unit 3120 that receives information on the slope of the smart watch from the ground from the slope sensor unit, and a controller 3130 that controls a display operation of the smart watch based on first slope information, second slope information, and a first reference value.

The information on the slope includes first slope information or second slope information.

Referring to FIG. 19, the apparatus for controlling the smart watch may receive slope information of the smart watch detected by the slope sensor unit and control an operation of a display included in the smart watch based on the received slope information.

Specifically, the slope sensor unit 3110 may be a linear level sensor, a circular level sensor, and an electronic level sensor or may be a sensor into which a gyro sensor is integrated.

That is, the slope sensor may include a plurality of sensors which can detect a tilt of the smart watch to increase the reliability of slope information.

The input unit 3120 receives one or more of first slope information and second slope information of the smart watch detected from the slope sensor unit 3110.

The controller 3130 determines a slope of the smart watch based on the first slope information, the second slope information, and the first reference value and control the operation of the display included in the smart watch. More specifically, the controller 3130 may control a power operation of the display or a content which can be displayed on the display, and may control a display position of the content.

Figure 20:
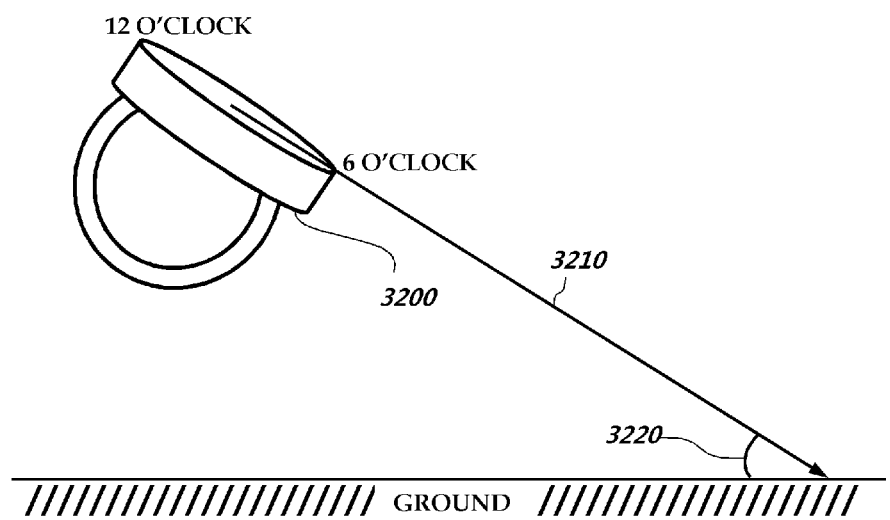
FIG. 20 is a view describing an example of first slope information according to another embodiment of the present invention.

FIG. 20 is a view describing an example of first slope information according to another embodiment of the present invention.

First slope information according to another embodiment of the present invention may include at least one of information on an inclined direction of the smart watch and a value of an angle between the ground and a vector facing the 6 o'clock direction from a center of the smart watch.

The slope sensor unit may generate slope detection information by detecting a slope of the smart watch. That is, the slope sensor may detect a slope of the display of the smart watch to generate slope information based on an angle between the display and the ground.

Referring to FIG. 20, the first slope information may include information on an angle 3220 between the ground and a vector 3210 facing the 6 o'clock direction from a center of a smart watch 3200.

Specifically, for example, when the smart watch 3200 is inclined such that the 6 o'clock direction is inclined more downwardly than the 12 o'clock direction on the face of the smart watch as illustrated in FIG. 20, information on the angle between the ground and the vector 3210 facing the 6 o'clock direction from the center of the smart watch may be obtained.

Such slope information may be obtained by a sensor detecting a slope such as a level or a gravity sensor.

For example, when the user wears the smart watch on his/her wrist and stands on the ground, the vector 3210 facing the 6 o'clock direction from the center is parallel to the ground.

Unlike the above, when the user raises his/her arm to identify the display of the smart watch and makes the display face the gaze direction, the vector 3210 facing the 6 o'clock direction from the center may have a predetermined angle 3220 from the ground.

Accordingly, the slope sensor unit may detect a slope change according to such a user's action and transmit the detected information to the input unit as first slope information.

The controller compares the first slope information with a preset first reference value. When the first slope information is equal to or larger than the first reference value, the controller may determine that the user is viewing the display and thus control to turn on the display.

When the smart watch has a flexible display, the vector facing the 6 o'clock direction from the center may be determined based on the display on the outside of the wrist of the user.

With or without the above described information, the first slope information may simply include information on an inclined direction of the smart watch.

For example, the first slope information may include only information indicating a state where the 6 o'clock direction is inclined more downwardly than the 12 o'clock or include information on the inclined direction together with the angle value.

Figure 21:
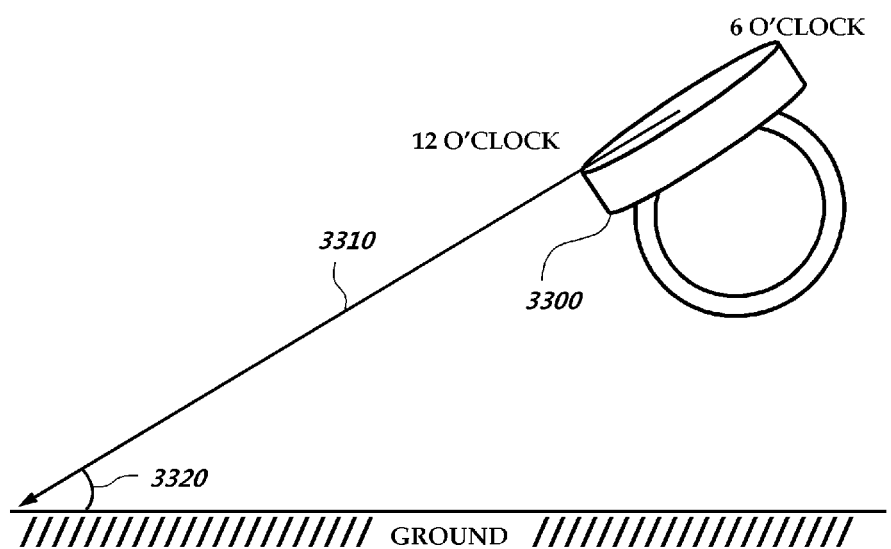
FIG. 21 is a view describing an example of second slope information according to another embodiment of the present invention.

FIG. 21 is a view describing an example of second slope information according to another embodiment of the present invention.

Second slope information according to another embodiment of the present invention may include at least one of information on an inclined direction of the smart watch and a value of an angle between the ground and a vector facing the 12 o'clock direction from a center of the smart watch.

Referring to FIG. 21, the second slope information may include a value of an angle 3320 between the ground and a vector 3310 facing the 12 o'clock direction from a center of a smart watch 3300.

Specifically, for example, when the smart watch 3300 is inclined such that the 6 o'clock direction is inclined more upwardly than the 12 o'clock direction on the face of the smart watch as illustrated in FIG. 21, information on the angle between the ground and the vector 3310 facing the 12 o'clock direction from the center of the smart watch may be obtained.

Such slope information may be obtained by a sensor detecting a slope such as a level or a gravity sensor.

For example, when the user wears the smart watch on his/her wrist and stands on the ground, the vector 3210 facing the 12 o'clock direction from the center is parallel to the ground.

Unlike the above, when the user raises his/her arm to rotate the display in a ground direction, the vector 3310 facing the 12 o'clock direction from the center may have a predetermined angle 3320 from the ground.

Accordingly, the slope sensor unit may detect a slope change according to such a user's action and transmit the detected information to the input unit as second slope information.

The controller compares the second slope information with a preset first reference value. When the second slope information is equal to or larger than the first reference value, the controller may control to display a content on the display located on the inside of the wrist.

When the smart watch has a flexible display, the vector facing the 12 o'clock direction from the center may be determined based on the display on the outside of the wrist of the user.

With or without the above described information, the second slope information may simply include information on an inclined direction of the smart watch.

For example, the second slope information may include only information indicating a state where the 12 o'clock direction is inclined more downwardly than the 6 o'clock or include information on the inclined direction together with the angle value.

Even when only the information on the inclined direction is received, the controller may control power of the display and the content display.

Figure 22:
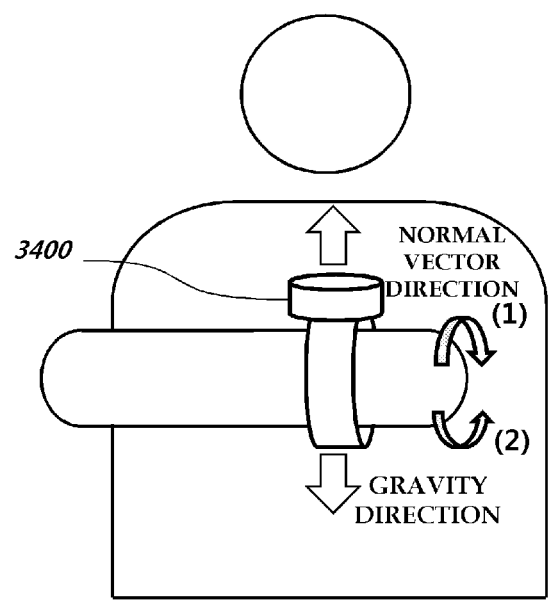
FIG. 22 is a view describing a display state according to a rotation direction of a smart watch according to another embodiment of the present invention.

FIG. 22 is a view describing a display state according to a rotation direction of the smart watch according to another embodiment of the present invention.

The first slope information and the second slope information described with reference to FIGS. 20 and 21 will described in more detail with reference to FIG. 22 considering a rotation direction of the smart watch.

Referring to FIG. 22, when the user rotates a smart watch 3400 in a direction of (1) to identify the display in a state where the user wears the smart watch 3400 on his/her wrist, first slope information may be detected.

That is, for example, in a condition as illustrated in FIG. 22, a body direction of the user is the 6 o'clock direction and an outward direction from the user is the 12 o'clock.

Accordingly, when the user rotates the wrist in the direction of (1), information on an angle between the ground and a vector facing the 6 o'clock direction from a center of the smart watch or information on an inclined direction may be detected.

In contrast, when the user rotates the wrist in the direction of (2), information on an angle between the ground and a vector facing the 12 o'clock direction from the center of the smart watch or information on an inclined direction may be detected.

Accordingly, the controller may receive first slope information in a case of (1) and second slope information in a case of (2) and may control power of the display and a content display.

For example, the controller may control to turn on the display located on the outside of the wrist in the case of (1) and may also control to display a particular content.

Alternatively, the controller may control to turn on the display located on the inside of the wrist in the case of (2) and may also control to display a content different from that in the case of (1). The displayed content may be configured according to user input information. Accordingly, it may be configured to display the same content.

Meanwhile, although the first slope information and the second slope information include only the information on the inclined direction without angle information, it may be detected that the user puts his/her eyes in a direction of the back of the hand in the case of (1) and it may be detected that the user puts his/her eyes in a direction of the palm in the case of (2). Accordingly, the controller may control the power of the display and the content display.

Figure 23:
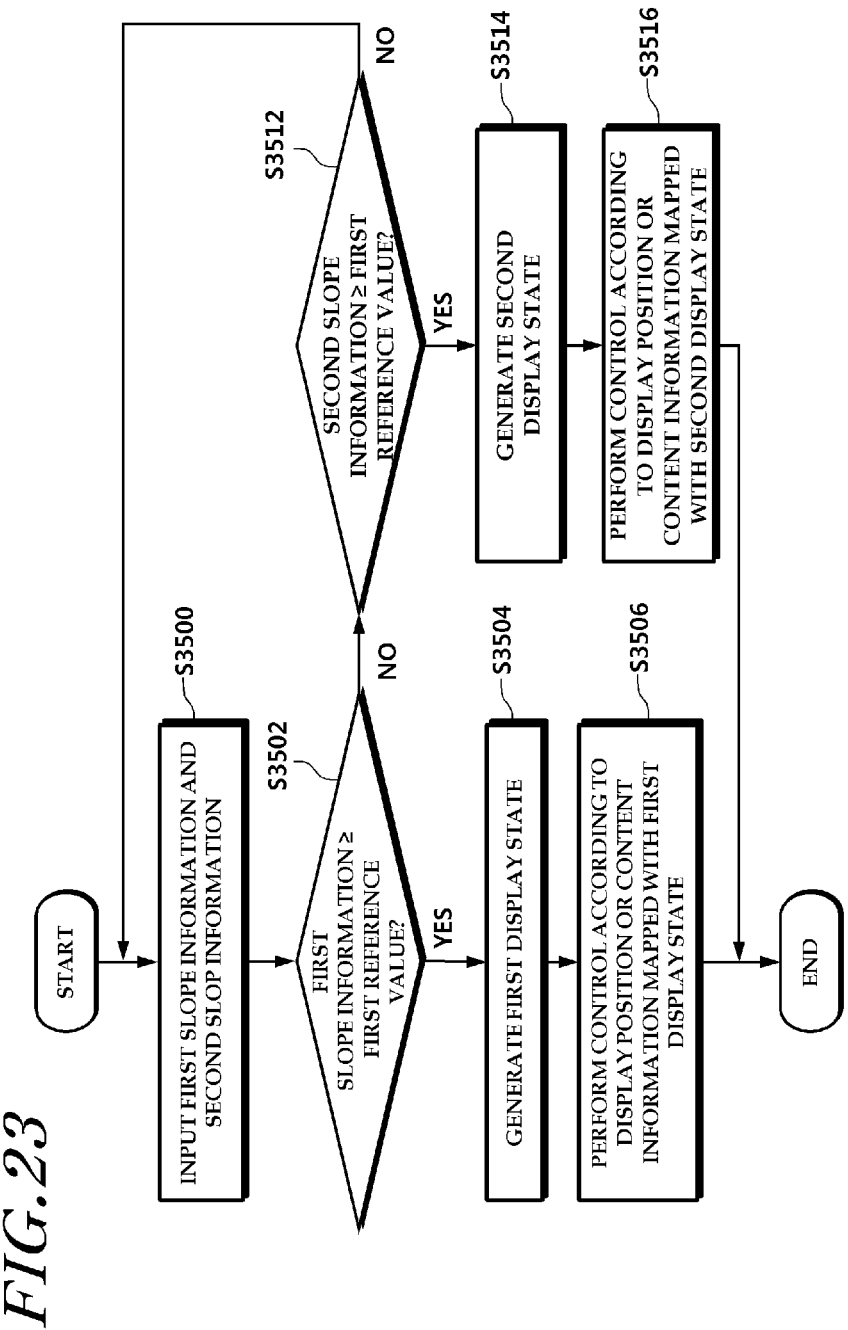
FIG. 23 is a flowchart illustrating an example of a method in which a controller according to another embodiment of the present invention controls a display operation.

FIG. 23 is a flowchart illustrating an example of a method in which the controller according to another embodiment of the present invention controls an operation of the display.

The controller according to another embodiment of the present invention may further include a display state determiner that determines a first display state when first slope information is equal to or larger than a first reference value and determines a second display state when second slope information is equal to or larger than the first reference value.

Referring to FIG. 23, for example, the controller may control an operation of the display by comparing first slope information and second slope information input into the input unit with the first reference value.

Further, when it is determined that the first display state or the second display state is generated, the controller according to another embodiment of the present invention may control power of the display and a content display.

Specifically, for example, the controller may receive the first slope information or the second slope information in step S3500. As described above, the first slope information may include one or more of the information on the angle between the ground and the vector facing the 6 o'clock direction from the center and the information on the inclined direction. Further, the second slope information may include one or more of the information on the angle between the ground and the vector facing the 12 o'clock direction from the center and the information on the inclined direction.

Meanwhile, the controller may receive one or more of the first slope information and the second slope information and compare the received slope information with the preset first reference value, so as to control the operation of the display.

For example, in a case where the first slope information and the second slope information include only the information on the inclined direction, if the corresponding inclined direction is detected, the controller may determine the first display state or the second display state without steps S3502 and S3512.

In another example, when the first slope information and the second slope information include only the angle information, the controller may determine the display state through the comparison with the preset first reference value. In this case, an effect of more finely controlling the operation of the display can be created.

Specifically, referring to FIG. 23, the controller receives the first slope information and the second slope information in step S3500.

The controller compares angle information included in the first slope information with the preset first reference value in step S3502. When the angle information included in the first slope information is equal to or larger than the first reference value, the controller determines the first display state in step S3504.

When the display state determiner determines the first display state, the controller controls the power of the display or the content display which has been mapped and configured with the first display state.

Meanwhile, when the first slope information is not received or the first slope information is smaller than the first reference value, the controller compares the second slope information with the first reference value in step S3512.

The display state determiner may determine the second display state when the second slope information is equal to or larger than the first reference value in step S3514.

When it is determined that the second display state is generated, the controller controls the display power or the content display which has been mapped with the second display state in step S3516.

Although it has been described that both the first slope information and the second slope information are compared with the first reference value, the first slope information may be compared with the first reference value and the second slope information may be compared with a reference value different from the first reference value.

Further, the first reference value may be pre-configured, or configured or changed according to a user input or an algorithm through which a use pattern of the user can be recognized.

Hereinafter, it will be described in more detail with reference to the drawings that the controller controls an operation of the display differently mapped according to each of the display states. The following description will be made with reference to FIG. 15.

The content according to another embodiment of the present invention may be a content separately mapped according to each of the first display state and the second display state.

As described above, according to the rotation direction of the smart watch worn on the user's wrist, the first display state of the second display state may be determined.

In this case, the controller may display a particular content mapped and configured with each of the display states.

For example, referring to FIG. 15, the smart watch 2710 displaying the time content may display a particular content since the first or second display state is generated according to a rotation by the user as indicated by a reference numeral 2712.

Specifically, for example, when it is determined that the first display state is generated based on a pre-mapped value or a value mapped according to a user input, the controller displays the time content as indicated by a reference numeral 2710. When it is determined that the second display state is generated, the controller may display an SMS message content or a mail content as indicated by a reference numeral 2712. The SMS message content or the mail content may be displayed in the first display state and the time content may be displayed in the second display state.

FIG. 16 shows a process of changing a content display position on the display according to the display state according to another embodiment of the present invention.

The content according to another embodiment of the present invention may be displayed on a display position of the display separately mapped according to each of the first display state and the second display state.

Referring to FIG. 16, for example, a display of the smart watch 2810 may be located on the inside of the wrist of the user as well as the outside of wrist of the user. Further, when a bendable display such as a flexible display is employed, the display may be configured on an entire wrist band part.

Specifically, for example, when the first display state is generated based on a pre-mapped value or a value mapped according to a user input (in the case of (1)), the controller may turn on a display part 2820 of the mapped part and display the mapped content.

Further, when the second display state is generated (in the case of (2)), the controller may turn on a display part 2830 mapped with the second display state and display another mapped content.

The display state determiner configures a first reference value and a plurality of reference values, and accordingly, may configure two or more display states and configure a plurality of display parts which can be mapped with the corresponding display states. Accordingly, the controller may control power of a display mapped with another part as well as the outside of the wrist and the inside of the wrist or may control to display a particular content.

The smart watch control device may include the slope sensor to control the display power and the displayed content. Further, the apparatus for controlling the smart watch may use a linear level or a circular level as the slope sensor or may use a sensor which can detect various slopes such as a multiaxial level or an electronic level.

Hereinafter, a case where the apparatus for controlling the smart watch further includes a direction detection sensor unit will be described with reference to the drawings as another embodiment.

Figure 24:
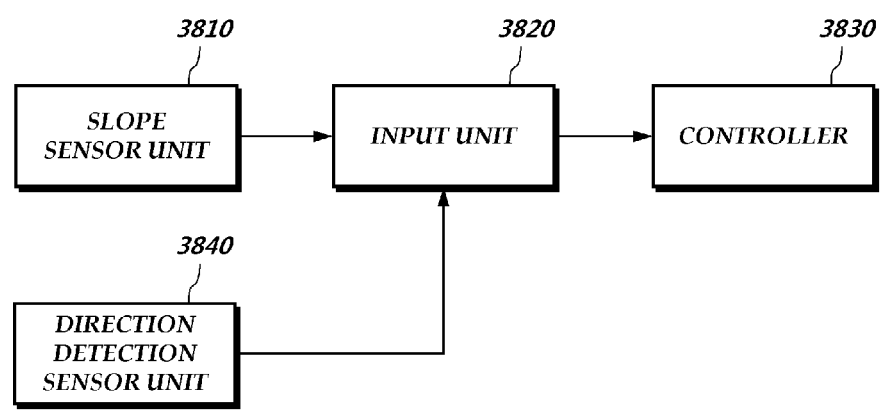
FIG. 24 is a block diagram illustrating the apparatus for controlling a smart watch including a direction detection sensor unit according to another embodiment of the present invention.

FIG. 24 is a block diagram illustrating the apparatus for controlling the smart watch including a direction detection sensor unit according to another embodiment of the present invention.

The apparatus for controlling the smart watch according to another embodiment of the present invention further includes a direction detection sensor unit that can detect a display direction of the smart watch, an input unit that may further receive display direction information from the direction detection sensor unit, and a controller that controls an operation of the display based on a comparison result between first slope information/second slope information and a first reference value and a comparison result between display direction information and a second reference value.

Referring to FIG. 24, for example, the apparatus for controlling the smart watch may include a slope sensor unit 3810, an input unit 3820, a controller 3830, and a direction detection sensor unit 3840.

The slope sensor unit 3810 may detect a slope of the smart watch as described above. For example, the slope sensor unit 3810 may detect information on an angle between the ground and a vector facing the 6 o'clock direction or 12 o'clock direction from a center of the smart watch or information on an inclined direction and transmit the detected information to the input unit 3820.

The direction detection sensor unit 3840 may detect information on a direction in which the display of the smart watch faces and transmit the detected information to the input unit 3820.

For example, the direction detection sensor unit 3840 may detect a display direction based on an angle difference between a normal vector direction of the display and a gravity direction.

The direction detection sensor unit 3840 will be described in more detail with reference to FIGS. 25 and 22.

The input unit 3820 may receive the first slope information and/or the second slope information from the slope sensor unit 3810 and further receive display direction information from the direction detection sensor unit 3840.

In controlling the power and operation of the display based on the input information, the controller 3830 may control the operation of the display based on a result of a comparison between the display direction information and a second reference value pre-configured through an experiment and the result of the comparison between the first slope information and/or the second slope information and the first reference value.

Hereinafter, operations of the direction detection sensor unit 3840 and the controller 3830 will be illustratively described with reference to the drawings.

Figure 25:
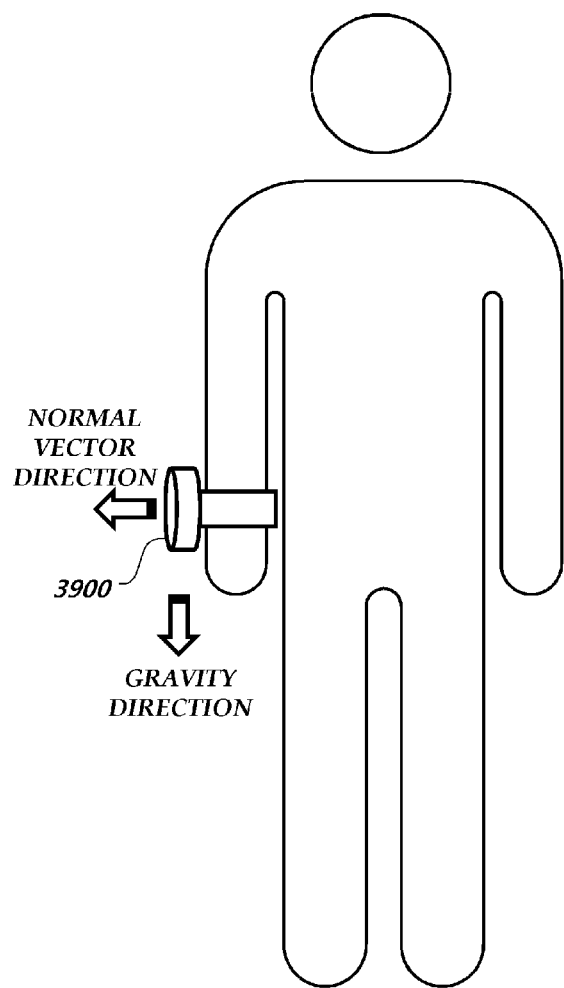
FIG. 25 illustrates an example of display direction information according to another embodiment of the present invention.

FIG. 25 illustrates an example of display direction information according to another embodiment of the present invention.

The direction detection sensor unit according to another embodiment of the present invention may detect a display direction based on an angle difference between a normal vector direction and a gravity direction.

Referring to FIG. 25, a case where a smart watch 3900 is worn on the user's wrist is described as an example.

A normal vector direction of the display included in the smart watch 3900 is an outward direction from the user and may have an angle difference of 90 degrees from the gravity direction as illustrated in FIG. 25.

When display direction information has information of 90 degrees which is the angle from the gravity direction as illustrated in the state of FIG. 25, since the display direction information is smaller than the second reference value if the second reference value is equal to or larger than 90 degrees, the display operation may not be controlled even though a change in slope information is detected or the first slope information and the second slope information is equal to or larger than the first reference value.

Accordingly, there is an effect of preventing a malfunction of the operation of the display based on slope change information and display direction information of the smart watch by adding the direction detection sensor unit.

Referring to FIG. 22, display direction information by the direction detection sensor unit when the user identifies a smart watch 3400 will be described as an example.

For example, when the user identifies the smart watch 3400, a normal vector direction of the display included in the smart watch has an angle difference from the gravity direction by 180 degrees. Accordingly, when the second reference value is configured as, for example, about 140 degrees, the display direction information is equal to or larger than the second reference value, so that the display operation control and the content control may be performed based on information of the slope sensor unit.

The second reference value may be a value preset through an experiment or a value configured according to a user input. Alternatively, the second reference value may be a value generated by recognizing a behavior pattern of the user and then corrected.

Figure 26:
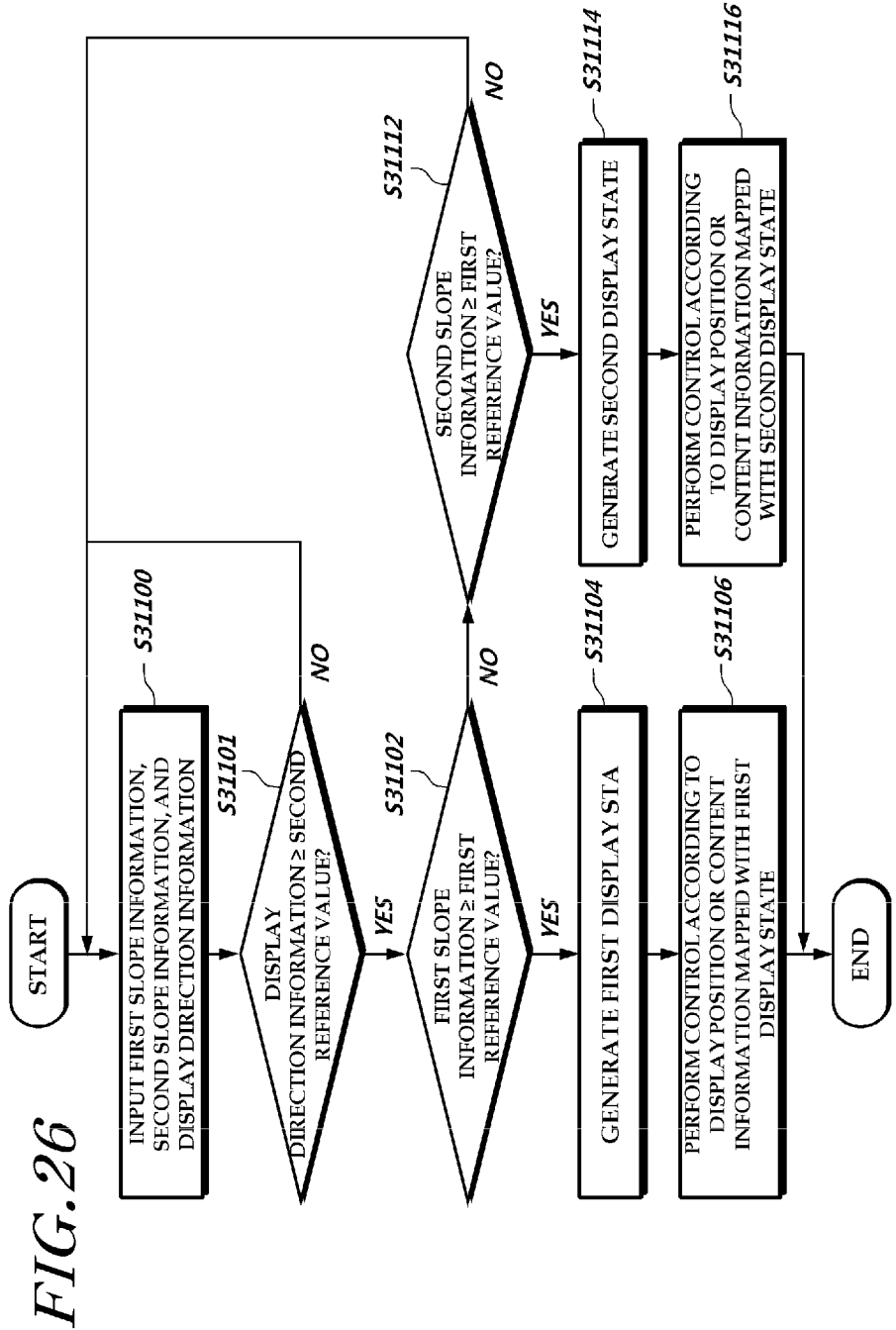
FIG. 26 is a flowchart illustrating an example of a method in which a controller according to another embodiment of the present invention controls a display operation.

FIG. 26 is a flowchart illustrating an example of a method in which the controller according to another embodiment of the present invention controls an operation of the display.

When the display direction information is equal to or larger than the second reference value, the controller according to another embodiment of the present invention may control the display power and the content display based on the result of the comparison between the first slope information/second slope information and the first reference value.

An operation of the controller will be illustratively described with reference to FIG. 26.

The controller according to another embodiment of the present invention may receive display direction information from the direction detection sensor unit and the display direction information from the slope detection information in step S31100. The corresponding information may be received by the input unit and then transmitted to the controller.

The controller compares the display direction information with a preset second reference value in step S31101.

Specifically, for example, the display direction information may be information on the angle between the gravity direction and the normal vector direction of the display as described above. Accordingly, when the display direction information is equal to or larger than the preset second reference value, the controller may determine a display operation state based on the slope information described in FIG. 23 in steps S31102 and S31112.

When it is determined that the display direction information is smaller than the second reference value, the controller waits for an input of a next signal without determining the display state based on the slope information.

As a result of the determination in step S31101, when the display direction information is equal to or larger than the second reference value, the controller recognizes an operation to identify the smart watch by the user and determines the display state based on the slope information.

That is, for example, the controller may identify whether the first slope information is equal to or larger than the first reference value in step S31102. When it is determined that the first slope information is equal to or larger than the first reference value, the controller determines that the first display state is generated in step S31104 and controls the display operation mapped with the first display state in step S31106. For example, the controller may display a content on the display in a direction of the back of the hand or controls a display of a preset particular content in step S31106.

Further, when the first slope information is smaller than the first reference value, the controller compares the second slope information with the first reference value in step S31112.

When it is determined that the second slope information is equal to or larger than the first reference value, the controller may recognize the second display state in step S31114.

The controller may perform a control according to a display position mapped with the second display state or content information in step S31116. That is, for example, the controller may display a content on the display in a direction of the back of the hand or controls a display of a preset particular content in step S31116.

When a plurality of displays are included in the smart watch, the display direction information of each of the displays may be compared with the second reference value.

That is, for example, when the display is located on the inside of the wrist, direction information of the display configured on the inside of the wrist may be compared with the second reference value.

Although it has been described that the user's action is recognized through the comparison between the display direction information and the second reference value, steps after step S31102 may be performed when the display faces a reverse direction of the ground even when the display direction information includes only information on the display direction without angle information.

That is, when it is determined that the display direction information is the reverse direction of the ground, the display power and the content display may be controlled based on slope information.

Hereinafter, the method of controlling the smart watch according to an embodiment of the present invention will be briefly described again with reference to FIGS. 19 to 26.

Figure 27:
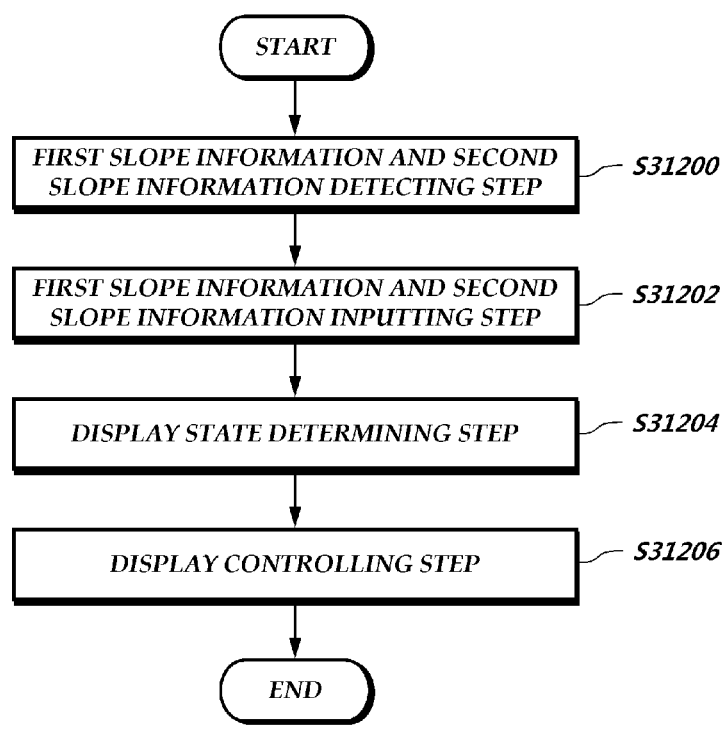
FIG. 27 illustrates an example of an operation of an apparatus for controlling a smart watch according to another embodiment of the present invention.

FIG. 27 illustrates an example of an operation of the apparatus for controlling the smart watch according to another embodiment of the present invention.

The apparatus for controlling the smart watch according to another embodiment of the present invention includes a step in which the slope sensor unit detects a slope of the smart watch, a step of receiving first slope information and second slope information from the slope sensor unit, and a step of controlling a display operation of the smart watch based on the first slope information, the second slope information, and a first reference value.

Referring to FIG. 27, the slope sensor unit detects one or more pieces of slope information including the first slope information and the second slope information in step S31200.

The input unit receives one or more pieces of slope information including the first slope information and the second slope information detected by the slope sensor unit in step S31202.

In the controlling step, a first display state is determined when first slope information is equal to or larger than the first reference value and a second display state is determined when second slope information is equal to or larger than the first reference value.

That is, the controller determines the display state according to a result of a comparison between at least one of the first slope information and the second slope information and the first reference value in step S31204.

Thereafter, the controller may control the display operation based on a display operation mapped and configured for each of the determined display states, a content display position, or a displayed content in step S31206.

Figure 28:
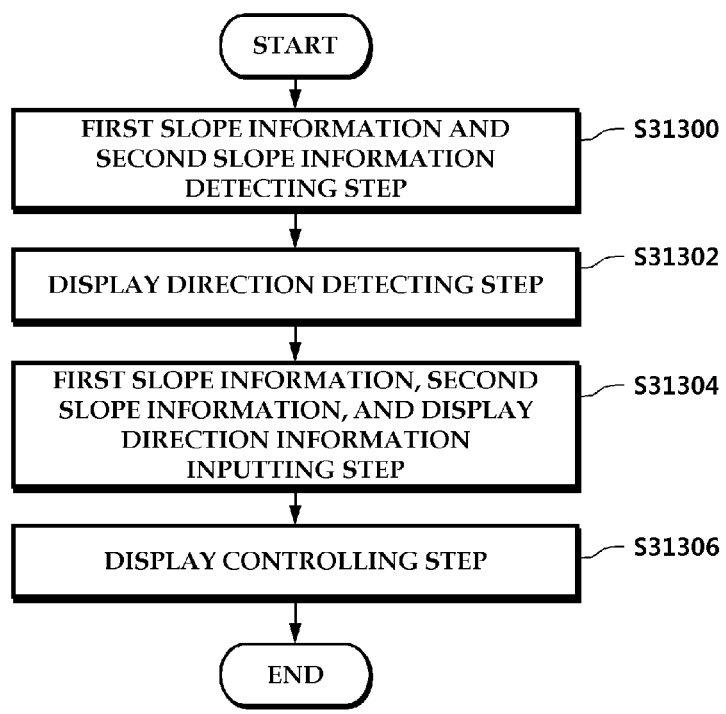
FIG. 28 illustrates another example of the operation of the apparatus for controlling the smart watch according to another embodiment of the present invention.

FIG. 28 illustrates another example of the operation of the apparatus for controlling the smart watch according to another embodiment of the present invention.

The method of controlling the smart watch according to another embodiment of the present invention may include a step in which the slope sensor unit detects a slope of the smart watch, a step in which the direction detection sensor unit detects a display direction of the smart watch, a step of receiving first slope information and second slope information from the slope sensor unit and receiving display direction information from the direction detection sensor unit, and a step of controlling a display operation based on a result of a comparison between the first slope information or the second slope information and the first reference value and a result of a comparison between the display direction information and a second reference value.

Referring to FIG. 28, the slope sensor unit may detect a slope of the smart watch to detect slope information including at least one of the first slope information and the second slope information in step S31300.

Further, the direction detection sensor unit detects a normal vector direction of the display included in the smart watch to generate display direction information in step S31302.

The input unit receives at least one of the first slope information, the second slope information, and the display direction information.

The controller controls the display operation based on the information input into the input unit in step S31306.

Specifically, for example, when the display direction information is recognized as a reverse direction of the ground or when it is determined that angle information included in the display direction information is equal to or larger than the second reference value, the controller compares the slope information and the first reference value.

When the first slope information or the second slope information is the first reference value, the controller determines a display state suitable for each state, and may control the display operation mapped and configured according to each display state, the content display, and the display power.

A computer-readable recording medium recording a program for executing the method of controlling the smart watch according to another embodiment of the present invention is provided. The program implements a function of detecting a slope of the smart watch and a function of controlling the display operation of the smart watch based on the first slope information, the second slope information, and the first reference value.

A computer-readable recording medium recording a program for executing the method of controlling the smart watch according to another embodiment of the present invention. The program implements a function of detecting a slope of the smart watch, a function of receiving the first slope information and the second slope information, and a function of controlling the display operation of the smart watch based on the first slope information, the second slope information, and the first reference value. Further, the computer-readable recording medium may implement all functions corresponding to the method of controlling the smart watch according to the embodiment of the present invention described with reference to FIGS. 19 to 28.

Even if it was described above that all of the components of an embodiment of the present invention are coupled as a single unit or coupled to be operated as a single unit, the present invention is not necessarily limited to such an embodiment. That is, at least two elements of all structural elements may be selectively joined and operate without departing from the scope of the present invention. Although the embodiments of the present invention have been described for illustrative purposes, those skilled in the art will appreciate that various modifications, additions and substitutions are possible, without departing from the scope and spirit of the invention. The scope of the present invention shall be construed on the basis of the accompanying claims in such a manner that all of the technical ideas included within the scope equivalent to the claims belong to the present invention.

CROSS-REFERENCE TO RELATED APPLICATION

This application claims priority from and the benefit under 35 U.S.C. § 119(a) of Korean Patent Application Nos. 10-2013-0019414, 10-2013-0073169, & 10-2013-0134022, filed on Feb. 22, 2013, Jun. 25, 2013, & Nov. 6, 2013 which are hereby incorporated by reference for all purposes as if fully set forth herein. In addition, this non-provisional application claims priorities in countries, other than the U.S., with the same reason based on the Korean Patent Applications, the entire contents of which are hereby incorporated by reference.

What is claimed is:

1. An apparatus for controlling a smart watch, the apparatus comprising:
   an input unit configured to receive position change information of the smart watch obtained from one or more of a speed change detecting sensor of the smart watch, a tilt sensor of the smart watch, and a gyroscope sensor of the smart watch;
   a reference direction configuration unit configured to calculate normal vector direction information of a display of the smart watch displaying a content based on the position change information, and both configure and store the normal vector direction information as a reference direction value;
   a user direction configuration unit configured to calculate a forward direction value, without tracking the user's eyes, based on the position change information including pendulum movement of the user's arm on which the smartwatch is worn, the pendulum movement being user specific and corresponding to the user's natural forward walking pattern, the forward direction value identifies an area out in front of the user with respect to the user's forward direction of travel based on the position change information received from the smart watch;
   a controller configured to control operation of the smart watch, including at least one of activation of the display and information displayed, based on a difference between the reference direction value and the forward direction value as calculated by the controller to determine whether the smart watch is in the area out in front of the user and facing the user;
   a secure payment system comprising:
     a request unit for making a request for payment information to a portable terminal;
     an authentication unit for authenticating whether an accessory is an accessory normally registered in the portable terminal; and
     a payment information manager for receiving and storing the payment information including at least one of a limited number of payments and a payment available time from the portable terminal when the authentication is succeeded, and removing the payment information when the limited number of payments or the payment available time is exceeded;

wherein:
the user direction configuration unit calculates a movement pattern of the smart watch based on the position change information, compares the movement pattern with user forward direction information configured and stored for each movement pattern of the smart watch, and configures particular forward direction information mapped and stored with the movement pattern of the smart watch as the user forward direction value;
when an acceleration change of the smart watch is equal to or larger than a first reference value based on the position change information, the reference direction configuration unit calculates the normal vector direction information of the display and updates and stores the reference direction value;
when a difference between a reverse direction value of the forward direction value and the reference direction value is within a second reference value, the controller turns on power of the display;
when a difference between the reverse direction value of the forward direction value and the reference direction value is within a third reference value, the controller displays a particular content on the display; and
the controller changes at least one of a display position and information of the content displayed on the display according to a pattern of change of the reference direction value.

2. The apparatus of claim 1, wherein the controller further controls an operation of a microphone installed in the smart watch based on at least one of a pattern of change of the reference direction value and a separation distance value between the smart watch and a user.

3. A method of controlling a smart watch, the method comprising:
receiving position change information of the smart watch obtained from one or more of a speed change detecting sensor, a tilt sensor, and a gyroscope sensor;
calculating normal vector direction information of a display of the smart watch displaying a content based on the position change information and then configuring and storing the normal vector direction information as a reference direction value;
calculating and configuring a forward direction value, without tracking the user's eyes, based on the position change information including pendulum movement of the user's arm on which the smartwatch is worn, the pendulum movement being user specific and corresponding to the user's natural forward walking pattern, the forward direction value identifies an area out in front of the user with respect to the user's forward direction of travel based on the position change information received from the smart watch; and
controlling an operation of the smart watch, including at least one of activation of the display and information displayed on the display, based on a difference between the reference direction value and the forward direction value to determine whether the smart watch is in the area out in front of the user and facing the user;
making a request for payment information to a portable terminal with a request unit;
authenticating whether an accessory is an accessory normally registered in the portable terminal with an authentication unit; and
receiving and storing the payment information with a payment information manager, the payment information including at least one of a limited number of payments and a payment available time from the portable terminal when the authentication is succeeded, and removing the payment information when the limited number of payments or the payment available time is exceeded;
wherein:
a user direction configuration unit of the smart watch: calculates a movement pattern of the smart watch based on the position change information; compares the movement pattern with user forward direction information configured and stored for each movement pattern of the smart watch; and configures particular forward direction information mapped and stored with the movement pattern of the smart watch as the forward direction value;
when an acceleration change of the smart watch is equal to or larger than a first reference value based on the position change information, the reference direction configuration unit calculates the normal vector direction information of the display and updates and stores the reference direction value;
when a difference between a reverse direction value of the forward direction value and the reference direction value is within a second reference value, the controller turns on power of the display;
when a difference between the reverse direction value of the forward direction value and the reference direction value is within a third reference value, the controller displays a particular content on the display; and
the controller changes at least one of a display position and information of the content displayed on the display according to a pattern of change of the reference direction value.

4. A smart watch system comprising:
a display of a smart watch;
at least one of a speed change detecting sensor, a tilt sensor, and a gyroscope of the smart watch;
an input unit of the smart watch configured to receive position change information of the smart watch obtained from one or more of the speed change detecting sensor, the tilt sensor, and the gyroscope sensor;
a reference direction configuration unit of the smart watch configured to determine a normal vector position of a normal vector that is at a right angle to a surface of the display, and determine and store a reference direction value based on the normal vector position;
a user direction configuration unit of the smart watch configured to calculate a movement pattern of the smart watch based on the position change information, and determine a forward direction value, without tracking the user's eyes, based on the position change information including pendulum movement of the user's arm on which the smartwatch is worn, the pendulum movement being user specific and corresponding to the user's natural forward walking pattern, the forward direction value identifies an area out in front of the user with respect to the user's forward direction of travel based on the position change information received from the smart watch; and
a controller of the smart watch configured to determine whether the smart watch is in the area out in front of the user and facing the user by calculating a difference between the reference direction value and the forward direction value, and control operation of the smart watch including at least one of activation of the display unit and information displayed on the display unit based on whether the smart watch is in the area out in front of the user and facing the user;
a secure payment system comprising:
- a request unit configured to make a request for payment information to a portable terminal;
- an authentication unit configured to authenticate whether an accessory is an accessory normally registered in the portable terminal; and
- a payment information manager configured to receive and store the payment information including at least one of a limited number of payments and a payment available time from the portable terminal when the authentication is succeeded, and remove the payment information when the limited number of payments or the payment available time is exceeded;

wherein:
the user direction configuration unit calculates a movement pattern of the smart watch based on the position change information, compares the movement pattern with user forward direction information configured and stored for each movement pattern of the smart watch, and configures particular forward direction information mapped and stored with the movement pattern of the smart watch as the forward direction value;

when an acceleration change of the smart watch is equal to or larger than a first reference value based on the position change information, the reference direction configuration unit calculates the normal vector direction information of the display and updates and stores the reference direction value;

when a difference between a reverse direction value of the forward direction value and the reference direction value is within a second reference value, the controller turns on power of the display;

when a difference between the reverse direction value of the forward direction value and the reference direction value is within a third reference value, the controller displays a particular content on the display; and the controller changes at least one of a display position and information of the content displayed on the display according to a pattern of change of the reference direction value.

* * * * *